United States Patent
Doi et al.

(10) Patent No.: US 8,374,202 B2
(45) Date of Patent: Feb. 12, 2013

(54) WIRELESS COMMUNICATION METHOD AND WIRELESS COMMUNICATION APPARATUS

(75) Inventors: Hiroshi Doi, Osaka (JP); Masahiro Mimura, Tokyo (JP); Taisuke Matsumoto, Sunnyvale, CA (US)

(73) Assignee: Panasonic Corporation, Osaka (JP)

( * ) Notice: Subject to any disclaimer, the term of this patent is extended or adjusted under 35 U.S.C. 154(b) by 1287 days.

(21) Appl. No.: 12/096,327

(22) PCT Filed: Dec. 7, 2006

(86) PCT No.: PCT/JP2006/324490
§ 371 (c)(1),
(2), (4) Date: Jun. 5, 2008

(87) PCT Pub. No.: WO2007/066741
PCT Pub. Date: Jun. 14, 2007

(65) Prior Publication Data
US 2010/0002659 A1   Jan. 7, 2010

(30) Foreign Application Priority Data
Dec. 7, 2005  (JP) .................................. 2005-352992

(51) Int. Cl.
*H04J 3/06*     (2006.01)
(52) U.S. Cl. ..................................................... 370/512
(58) Field of Classification Search .................. 370/512, 370/510, 509, 507, 505, 504, 503, 501, 500, 370/499, 498, 464, 511, 514, 520, 310, 315, 370/316, 319, 321, 324
See application file for complete search history.

(56) References Cited

U.S. PATENT DOCUMENTS

| | | | | |
|---|---|---|---|---|
| 5,173,899 A * | 12/1992 | Ballance | .................... | 370/503 |
| 6,625,463 B1 * | 9/2003 | Xiao et al. | .................... | 455/502 |
| 7,058,729 B1 * | 6/2006 | Le Scolan et al. | ............ | 709/248 |
| RE40,918 E * | 9/2009 | Dupuy | .......................... | 370/509 |
| 2001/0021654 A1 | 9/2001 | Spratt | | |
| 2004/0196872 A1 * | 10/2004 | Nakamura | .................... | 370/512 |
| 2006/0245440 A1 | 11/2006 | Mizukoshi | | |

FOREIGN PATENT DOCUMENTS

| | | |
|---|---|---|
| JP | 10-145847 | 5/1998 |
| JP | 2001-298406 | 10/2001 |
| JP | 2006-311172 | 11/2006 |

OTHER PUBLICATIONS

International Search Report dated Jan. 9, 2007.
Z. Yunpeng, et al., "Towards High Speed Wireless Personal Area Network-Efficiency Analysis of MBOA MAC," Internet URL: http://www.ctr.kcl.ac.uk/IWWAN2005/papers/88_invited_Philips.pdf, May 25, 2005, 10 pages total, p. 3, line 16.

* cited by examiner

*Primary Examiner* — Fan Ng
(74) *Attorney, Agent, or Firm* — Dickinson Wright PLLC

(57) ABSTRACT

A wireless communication method wherein the power consumption can be reduced as compared with the conventional one and a wireless communication apparatus can synchronize its super-frame with the super-frame of another wireless communication apparatus in an ad hoc network. According to this method, in the ad hoc network where a plurality of wireless communication apparatuses use broadband signals to data-communicate with each other, a wireless communication apparatus transmits an end tone (201) for identifying the end of a super-frame (221), and when another wireless communication apparatus receives the end tone (202), it synchronizes the end of its super-frame (221) with the end of the foregoing super-frame (221). In this way, the super-frames (221) can be synchronized even without any beacons.

27 Claims, 27 Drawing Sheets

| | SEND/RECEIVE TONE (500 nsec) | BEGINNING TONE 1 (750 nsec) | BEGINNING TONE 2 (1500 nsec) | END TONE (3000 nsec) |
|---|---|---|---|---|
| PROBE SLOT (INITIAL SIGNAL) | IGNORE | TRANSMIT BEGINNING TONE 2 BROADBAND SYNCHRONIZATION | WAIT FOR ANOTHER BEGINNING TONE 2 | RE-SYNCHRONIZATION AT NEXT END TONE |
| PROBE SLOT (NOT INITIAL) NORMAL PROBE BEGINNING TONE 1 SENDER | TRANSMIT SEND/ RECEIVE TONE BROADBAND RECEPTION | IGNORE | IGNORE | RE-SYNCHRONIZATION AT NEXT END TONE |
| PROBE SLOT (NOT INITIAL) NORMAL PROBE BEGINNING TONE 1 RECEIVER | RECEIVE OPERATION PROBE RESPONSE | TRANSMIT BEGINNING TONE 2 BROADBAND RECEPTION SUBSEQUENT R/Ce-S | IGNORE | RE-SYNCHRONIZATION AT NEXT END TONE |
| PROBE SLOT (NOT INITIAL) NORMAL PROBE BEGINNING TONE 2 RECEIVER | IGNORE | IGNORE | SUBSEQUENT RTS/ CTS-e SLOT | RE-SYNCHRONIZATION AT NEXT END TONE |
| TRANSMIT/RECEIVE SLOT | NORMAL RECEPTION (BROADBAND COMMUNICATION) | RE-SYNCHRONIZATION AT NEXT END TONE PROBE SLOT TIME | RE-SYNCHRONIZATION AT NEXT END TONE | RE-SYNCHRONIZATION AT NEXT END TONE |

FIG.14

| | SEND/RECEIVE TONE (500 nsec) | BEGINNING TONE 1 (750 nsec) | BEGINNING TONE 2 (1500 nsec) | END TONE (3000 nsec) |
|---|---|---|---|---|
| PROBE SLOT (NOT INITIAL) 6-DIRECTION PROBE BEGINNING TONE 1 SENDER | NORMAL RECEPTION | IGNORE | IGNORE | RE-SYNCHRONIZATION AT NEXT END TONE |
| PROBE SLOT (NOT INITIAL) 6-DIRECTION PROBE BEGINNING TONE 1 RECEIVER | NORMAL RECEPTION PROBE RESPONSE TRANSMISSION IF NO DATA | TRANSMIT BEGINNING TONE 2 R/C-eS AFTER NORMAL RECEPTION | RTS/CTS-e SLOT AFTER PROBE SLOT TIME WAIT | RE-SYNCHRONIZATION AT NEXT END TONE |
| PROBE SLOT (NOT INITIAL) 6-DIRECTION PROBE BEGINNING TONE 2 RECEIVER | IGNORE | IGNORE | SUBSEQUENT RTS/CTS-e SLOT | RE-SYNCHRONIZATION AT NEXT END TONE |
| END TONE SLOT BEFORE END TONE RECEPTION | IGNORE | IGNORE | IGNORE | END TONE SYNCHRONIZATION (END TONE TRANSMISSION) |
| END TONE SLOT AFTER END TONE RECEPTION | IGNORE | IGNORE | IGNORE | END TONE RESYNCHRONIZATION (END TONE TRANSMISSION) |

FIG.15

| TOC 1901 | TITLE 1902 | ARTIST 1903 | TRACK 1904 / MEDIA 1905 | SHADOW 1907 / TIME LIMIT 1906 | CODEC 1908 / RATE |
|---|---|---|---|---|---|
| xxx.yyy | TITLE 1 | ARTIST 1 | 2 / ON | ON / ∞ | Mp3 / 128k |
| aaa.ab | TITLE 2 | ARTIST 2 | 5 / OFF | ON / 45Ds | AAC / 128k |
| 111.22 | TITLE 3 | ARTIST 3 | 11 / ON | OFF / 23Ds | Mp3 / 128k |
| | | | | | |

WIRELESS COMMUNICATION METHOD AND WIRELESS COMMUNICATION APPARATUS

TECHNICAL FIELD

The present invention relates to a radio communication network, and more particularly to ad hoc network communication in a mobile environment.

BACKGROUND ART

In recent years, various proposals have been made concerning UWB (Ultra Wide Band) radio communication methods. As UWB radio communication is broadband communication exceeding 1 Gbps, its application to video transmission and the like with large transmission capacity has been investigated. On the other hand, UWB cannot be said to be easy to use in an office environment due to the narrowness of its possible communication range, and it can be said to be better suited to PANs (Personal Area Networks) that are attracting attention nowadays. However, PANs are still in their early days, and there are very few major applications. This is because a device exploiting the broadband characteristics generally uses a lot of power, but in the case of a PAN, movement is difficult while carrying a large number of batteries.

One application that uses a PAN and requires the broadband characteristics of UWB is a file exchange (file-swapping, file-sharing) application. The basic operating principle of a file exchange application is disclosed in Patent Document 1, for example. It is possible to create a mini-community with random file exchange in a mobile environment (referred to as message exchange in Patent Document 1). Although not mentioned in Patent Document 1, exchanged data is not limited to text documents, and the exchange of music, image, video, and suchlike files is also possible. With UWB in particular, since the effective transmission speed is 100 Mbps to several Gbps, it is possible to exchange large files that bypass each other, and this kind of file exchange can be said to be an application suited to UWB.

Various discussions concerning transmitting methods used in this UWB have emerged in IEEE802.15. There are many cases in which a MAC protocol implemented in a PAN (and more particularly, a mobile PAN) environment is a method using autonomous distributed processing. This is because, in a PAN environment in which terminals constantly pass by each other, constructing a master-slave relationship each time, and starting communication after setting up a communication environment, such as assigning data slots, is a major overhead.

Non-patent Document 1 discloses a radio communication method in an autonomous distribution type PAN.

FIG. 1 is a drawing showing the configuration of a super-frame in TDMA (Time Division Multiple Access).

In FIG. 1, a super-frame is divided into a beacon period 2201 and a data period 2202.

Beacons 2203 are transmitted from radio communication apparatuses within beacon period 2201, and it is guaranteed that beacons of neighbor nodes propagate to neighbor nodes without colliding.

Data period 2202 is divided equally into slots 2204, and slot IDs are assigned in that order, but this is not a limitation, and data periods may be unequal, and need not be contiguous. Patent Document 1: Unexamined Japanese Patent Publication No. 2001-298406

Non-patent Document 1: "Towards High Speed Wireless Personal Area Network-Efficiency Analysis of MBOA MAC", Yunpeng Zang, et al, Internet URL: http://www.ctr.k-cl.ac.uk/IWWAN2005/papers/88_invited_Philips.pdf

DISCLOSURE OF INVENTION

Problems to be Solved by the Invention

However, in the case of the radio communication method described in Non-patent Document 1, if there are mixed super-frame groups that share a beacon period, data slot and beacon period collisions may occur.

One possible method of solving this problem is for all nodes belonging to a PAN to constantly detect super-frame group collisions, and to compose an algorithm that adapts to this in a distributed fashion.

However, with the above-described method, it is necessary for a radio communication apparatus to keep its beacon receiving section in a reception wait (standby) state at all times, and reception standby power is large. This is difficult to allow in UWB communication, and is a major demerit in an environment in which power can only be expected to be supplied by a battery, as in the case of a mobile communication apparatus.

Also, since a radio communication apparatus must constantly emit a beacon regardless of whether or not there are other radio communication apparatuses in the vicinity, power consumption is further increased.

It is an object of the present invention to provide a radio communication method and radio communication apparatus that enable power consumption to be reduced as compared with a conventional case, and a super-frame to be synchronized with the super-frame of another radio communication apparatus, in an ad hoc network.

Means for Solving the Problems

A radio communication method of the present invention is a radio communication method whereby a plurality of radio communication apparatuses communicate with each other in an ad hoc network, and has a step of transmitting an end tone for identifying the end of a super-frame from one radio communication apparatus, and a step of synchronizing at another radio communication apparatus, the end of its own super-frame when having received that end tone.

By this means, a radio communication apparatus performs synchronization with a super-frame by using a low-power-consumption tone signal, without using a beacon provided by a modulated signal, enabling power consumption to be reduced as compared with a conventional method.

Also, a radio communication apparatus of the present invention has a tone signal communication section that transmits and receives tone signals, a data signal communication section that performs modulation and transmits and receives data by means of a broadband signal, a time management section, and a frame transmitting/receiving section. This time management section measures elapsed time in a super-frame, transmits an end tone for identifying the end from the tone signal communication section, or receives an end tone from the tone signal communication section, and re-sets the end time based on the end tone received first before its own end time. The frame transmitting/receiving section transmits a send/receive tone for giving notification of data transmission from the tone signal communication section after the elapse of a predetermined time based on the end time re-set by the time management section, and after transmission of that send/ receive tone is completed, transmits data from the data signal communication section, or sets the data signal communication section to a reception-enabled state when a send/receive tone is received, and receives data from the data signal communication section.

By means of this configuration, the radio communication apparatus can implement super-frame synchronization between super-frame groups without using a beacon.

Advantageous Effect of the Invention

According to the present invention, in an ad hoc network a radio communication apparatus can reduce stand by power consumption as compared with a conventional case, and super-frame synchronization adjustment becomes possible in a mobile environment. As a result, communication with another radio communication apparatus can be started in a minimal time.

BRIEF DESCRIPTION OF DRAWINGS

FIG. 14 is a drawing showing operations when a radio communication apparatus according to Embodiment 1 of the present invention receives a tone signal;

FIG. 15 is a drawing showing operations when a radio communication apparatus according to Embodiment 1 of the present invention receives a tone signal;

FIG. 22 is a drawing showing the configuration of a music software file list managed by a mobile file exchange apparatus according to Embodiment 4 of the present invention;

BEST MODE FOR CARRYING OUT THE INVENTION

Embodiments of the present invention will now be described with reference to the accompanying drawings. In the following embodiments, radio communication apparatuses are assumed to perform data communication procedures by means of millimeter wave UWB.

Embodiment 1

Figure 1:
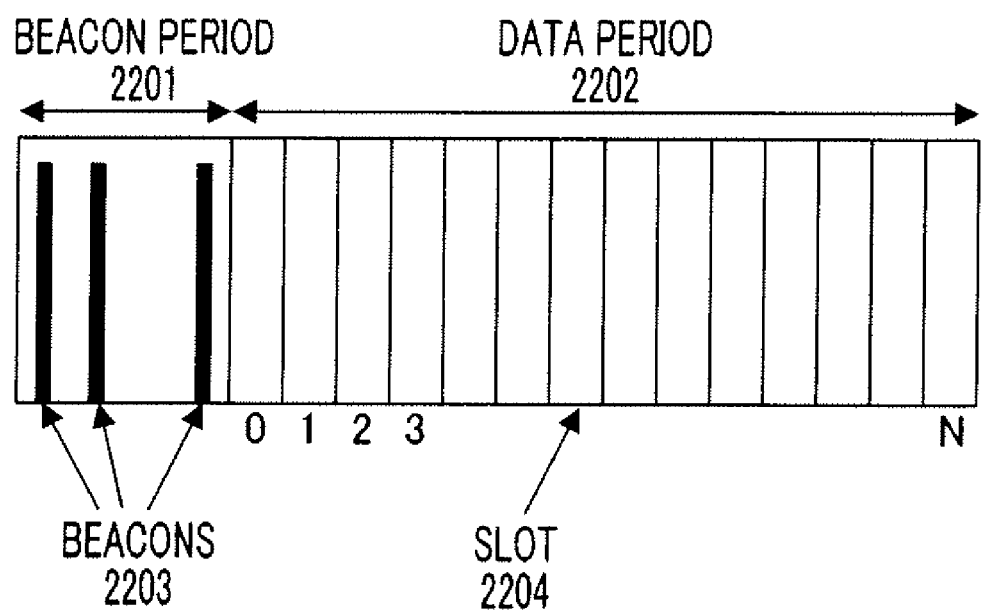
FIG. 1 is a drawing showing the configuration of a TDMA super-frame in a conventional radio communication method.
Figure 2:
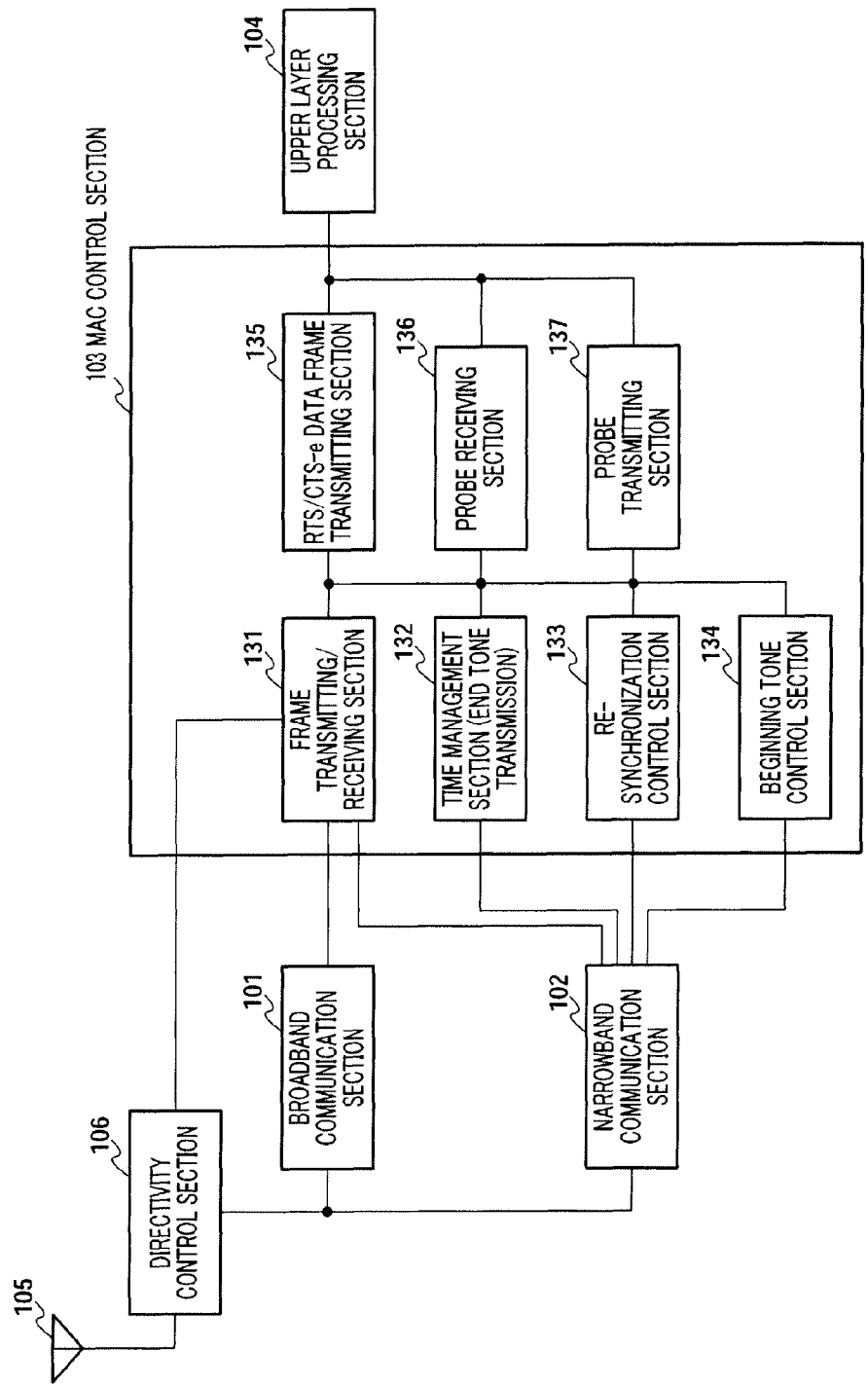
FIG. 2 is a drawing showing the configuration of a radio communication apparatus according to Embodiment 1 of the present invention.

FIG. 2 is a configuration diagram of a radio communication apparatus according to this embodiment of the present invention.

In FIG. 2, the radio communication apparatus is equipped with an antenna 105, a directivity control section 106, a broadband communication section 101, a narrowband communication section 102, a MAC control section 103, and an upper layer processing section 104.

Antenna 105 comprises a plurality of directional antennas each responsible for a particular sector, and directivity control section 106 controls the directional antennas composing antenna 105 and determines the communication range. Broadband communication section 101 transmits and receives UWB signals, and narrowband communication section 102 transmits and receives narrowband signals with or without performing modulation. If a broadband signal is DS-UWB (Direct Sequence UWB), the respective transmitters may be shared so as to widen the transmitted DS-UWB pulse width in order to transmit a narrowband signal.

Upper layer processing section 104 executes various kinds of applications, generates transmit data such as content data and sends this to MAC control section 103, and also receives receive data from MAC control section 103 and performs application processing.

MAC control section 103 performs MAC protocol processing, and has a frame transmitting/receiving section 131, a time management section 132, a re-synchronization control section 133, a beginning tone control section 134, an RTS/CTS-e data frame transmitting section 135, a probe receiving section 136, and a probe transmitting section 137.

Frame transmitting/receiving section 131 transmits and receives a send/receive tone giving notification of data communication, and transmits/receives a subsequent frame by means of a narrowband signal using an RTS/CTS (Ready to Send/Clear to Send) extended method (RTS/CTS-e method) described later herein.

Time management section 132 manages time from the start time of a super-frame, and measures the transmission time of an end tone that gives notification of the end of its own super-frame, and also performs timing exchange with narrowband communication section 102 in order to perform synchronization with the end tone of another node (such as a radio communication apparatus).

Re-synchronization control section 133 transmits a re-synchronization signal via narrowband communication section 102 in order to synchronize with another super-frame group. Also, re-synchronization control section 133 monitors end tones over the entire super-frame range, and reports the timing of synchronization with another super-frame to time management section 132.

Beginning tone control section 134 transmits or receives a beginning tone 1 or beginning tone 2 for avoiding a data communication collision in accordance with a CSMA/CA (Carrier Sense Multiple Access with Collision Avoidance) procedure with a tone as a carrier.

RTS/CTS-e data frame transmitting section 135 generates a frame for transmitting data received from upper layer processing section 104, and sends this to frame transmitting/receiving section 131. RTS/CTS-e data frame transmitting section 135 also generates an RTS command of the RTS/CTS extended method (RTS/CTS-e method) described later herein, and sends this to frame transmitting/receiving section 131.

Probe receiving section 136 receives a probe request from another radio communication apparatus, generates information such as its own attributes and communication environment, and responds to the requesting node. This probe request asks the request destination for information such as the attributes and communication environment of that node.

Probe transmitting section 137 generates a probe request for requesting information such as the attributes and communication environment of a neighbor node, and transmits this to a neighbor node. Also, on receiving a probe response from a probe request destination node, probe transmitting section 137 transmits "probe end" as a response.

Various kinds of tone signals and frames according to the present invention will now be described. First, a definition of a tone signal will be given. Here, a tone signal denotes an electrical signal that is identified by continuous transmission for a determined time without regard to narrowband signal modulation/non-modulation. The configuration closely resembles a busy tone used to convey to a neighbor node a state in which a signal is being emitted, such as in BTMA (Busy-Tone Multiple Access) or DBTMA (Dual Busy-Tone Multiple Access), for example.

Figure 3:
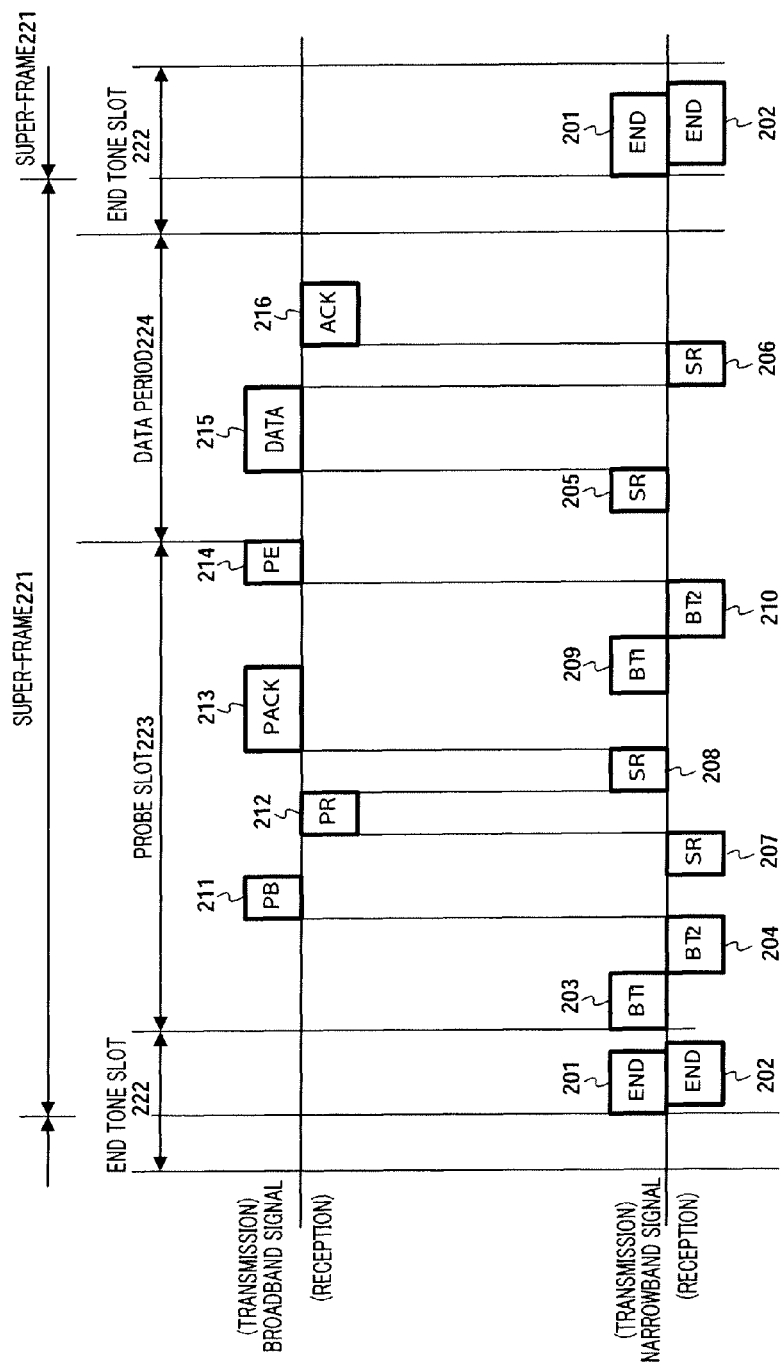
FIG. 3 is a timing chart showing a tone signal and frame transmission/reception protocol according to Embodiment 1 of the present invention.

FIG. 3 is a timing chart showing a transmission/reception protocol for this tone signal and frame.

In FIG. 3, a super-frame 221 is divided into end tone slots 222, a probe slot 223, and a data period 224.

An end tone slot 222 is a period in which end tones (END) 201 and 202 are transmitted and received. Probe slot 223 is a period in which beginning tone 1 (BT1) 203, beginning tone 2 (BT2) 204, probe request (PB) 211, probe response (PR) 212, acknowledge (PACK) 213, and probe end (PE) 214, are transmitted and received. Data period 224 is a period in which send/receive tones (SR) 205 and 206, data 215, and ACK/NACK 216, are transmitted and received.

Figure 4:
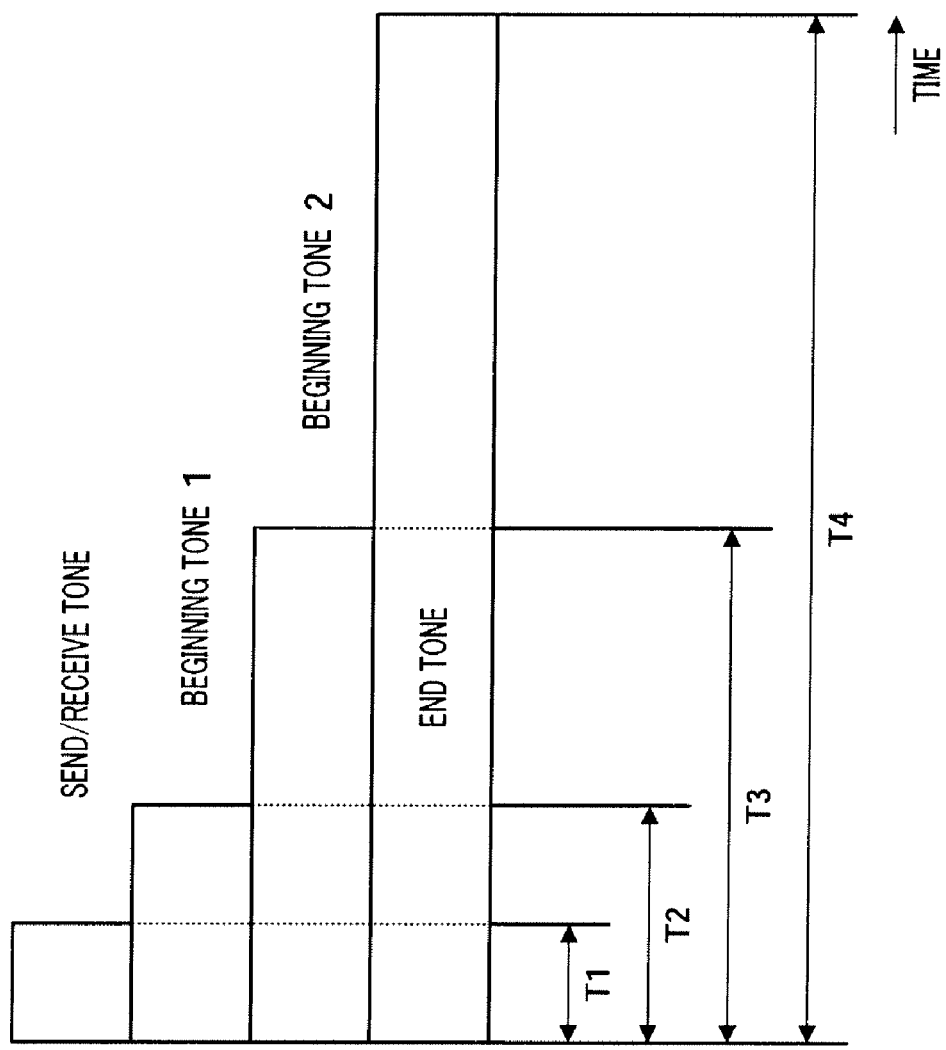
FIG. 4 is a drawing showing the length of each tone signal according to Embodiment 1 of the present invention.

FIG. 4 is a drawing showing the length of each tone signal. That is to say, beginning tone 1 duration T2 is twice the length of send/receive tone duration T1, beginning tone 2 duration T3 is twice the length of beginning tone 1 duration T2, and end tone duration T4 is twice the length of beginning tone 2 duration T3. Beginning tone 2 duration T3 must be no more than half the length of end tone duration T4, but apart from this the above ratios need not be maintained, and it is only necessary for the relationships of the length to be maintained. This is because even if two or more beginning tones 2 are detected, detection as beginning tone 2 is necessary. The occurrence of three or more beginning tones 2 in series, resulting in a multiple of two or more, is judged to be extremely rare.

For example, when a send/receive tone is stipulated as being 10 microseconds in length, on receiving a tone signal, narrowband communication section 102 determines a tone signal whose duration is less than 10 microseconds to be a send/receive tone. Narrowband communication section 102 determines a tone signal from 10 microseconds to the beginning tone 1 duration to be beginning tone 1. Furthermore, narrowband communication section 102 determines a tone signal from the beginning tone 1 duration to the beginning tone 2 duration to be beginning tone 2, and determines a tone signal of greater duration to be an end tone.

The operation and action of a radio communication apparatus configured as described above will now be explained.

First, super-frame synchronization processing will be described.

Figure 5:
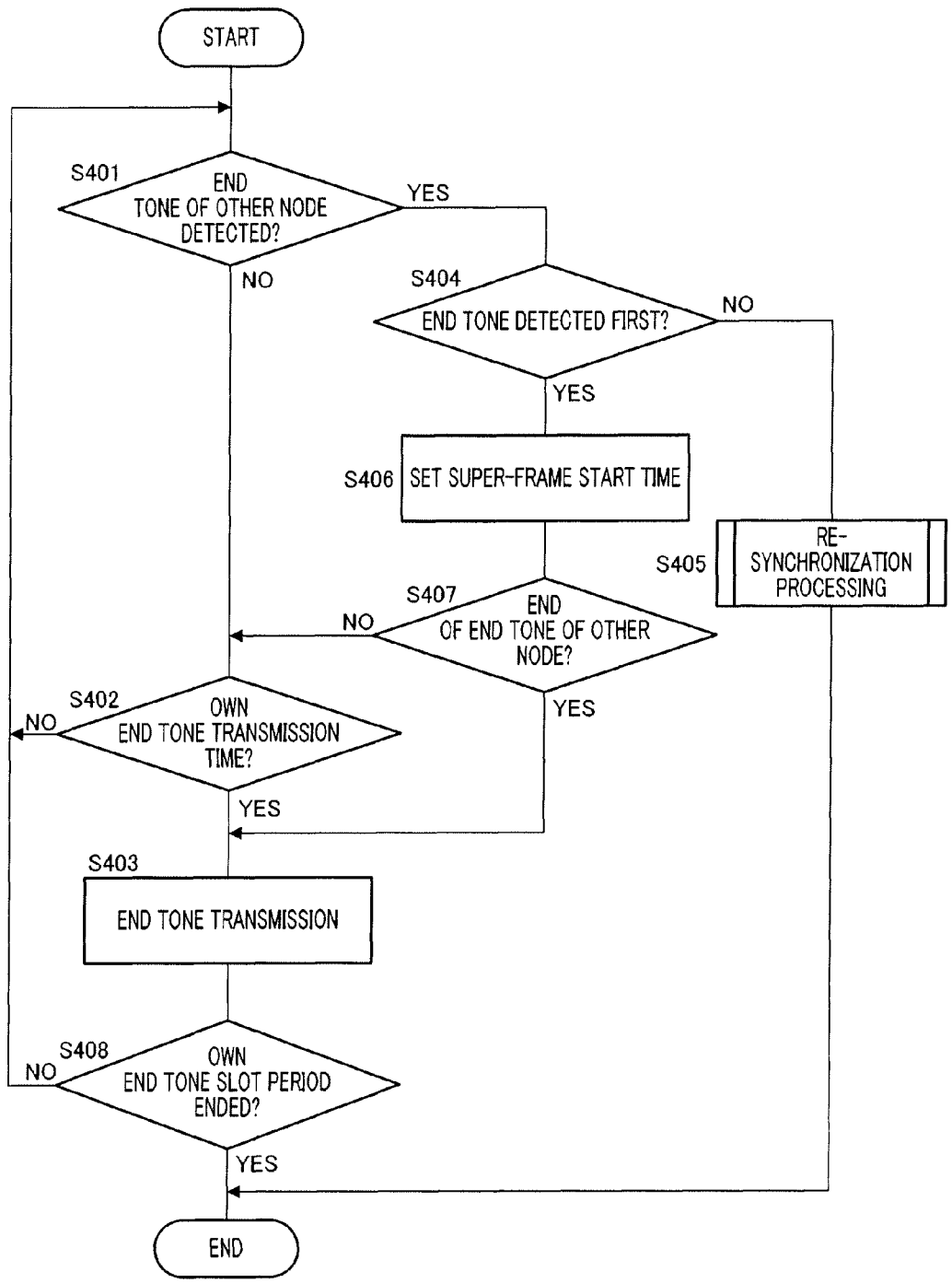
FIG. 5 is a flowchart explaining super-frame synchronization processing according to Embodiment 1 of the present invention.

FIG. 5 is a flowchart explaining super-frame synchronization processing.

In FIG. 5, first, if there is no notification of detection of an end tone of another node from narrowband communication section 102 (step S401), time management section 132 checks whether or not it is time to transmit the apparatus's own end tone (step S402).

If it is not time to transmit the apparatus's own end tone, the processing flow returns to step S401, whereas if it is time to transmit, time management section 132 directs narrowband communication section 102 to transmit the apparatus's own end tone. Narrowband communication section 102 receives this directive, transmits an end tone (step S403), and proceeds to the processing in step S408 described later herein.

On the other hand, if narrowband communication section 102 detects an end tone from another node, it notifies time management section 132. Time management section 132 checks whether or not the present end tone detection was prior to the apparatus's own end tone output, and was reported first in the current end tone slot (step S404). Then, if the end tone is not first, time management section 132 performs re-synchronization processing described later herein (step S405) and terminates the processing.

On the other hand, if the end tone was reported first, time management section 132 sets the start time of super-frame period managed by itself to the current time (step S406).

Next, time management section 132 checks whether or not the notification from narrowband communication section 102 reports the end of an end tone from another node (step S407).

If this is not the end of an end tone, narrowband communication section 102 returns to step S402, whereas if this is the end, narrowband communication section 102 proceeds to step S403 and performs processing to transmit the apparatus's own end tone (step S403). After the end of end tone transmission, time management section 132 performs confirmation as to whether or not its own end tone slot period has ended (step S408). If its own end tone slot period has ended, processing is terminated. If its own end tone slot period has not ended, the processing flow returns to step S401.

Thus, time management section 132 transmits end tone 201 when it measures the end tone output time, but if it detects end tone 202 transmitted from another neighbor node within the end tone slot 222 range, measures the time difference from its own end tone 201. Then time management section 132 sets its own super-frame end time to the start time of end tone 202 detected earlier than its own.

With regard to time management section 132, neighbor nodes also transmit an end tone within the same end tone slot 222, but all nodes set their own end tone start times to the end tone transmission start time of the node that transmits the earliest end tone among these. If the apparatus's own end tone transmission start time arrives during reception of the earliest end tone transmitted from another node, an end tone is transmitted, but if end tone reception is completed before the apparatus's own end tone transmission start time, the apparatus's own end tone is transmitted at that point in time.

By this means, it is possible for each node to synchronize with the earliest end tone in a super-frame.

Then, based on the start time of this synchronized super-frame 221, time management section 132 measures the timing of probe slot 223 and a data slot within data period 224. Assuming that a super-frame is defined as 64 ms, and the length of end tone slot 222 as 512 microseconds, time management section 132 transmits an end tone after the elapse of 256 microseconds, which is the midway point of end tone slot 222. This is to allow accommodation in end tone slot 222 of another radio communication apparatus even if the end tone start time of this apparatus varies.

This super-frame synchronization operation will now be described using an actual example.

Figure 6:
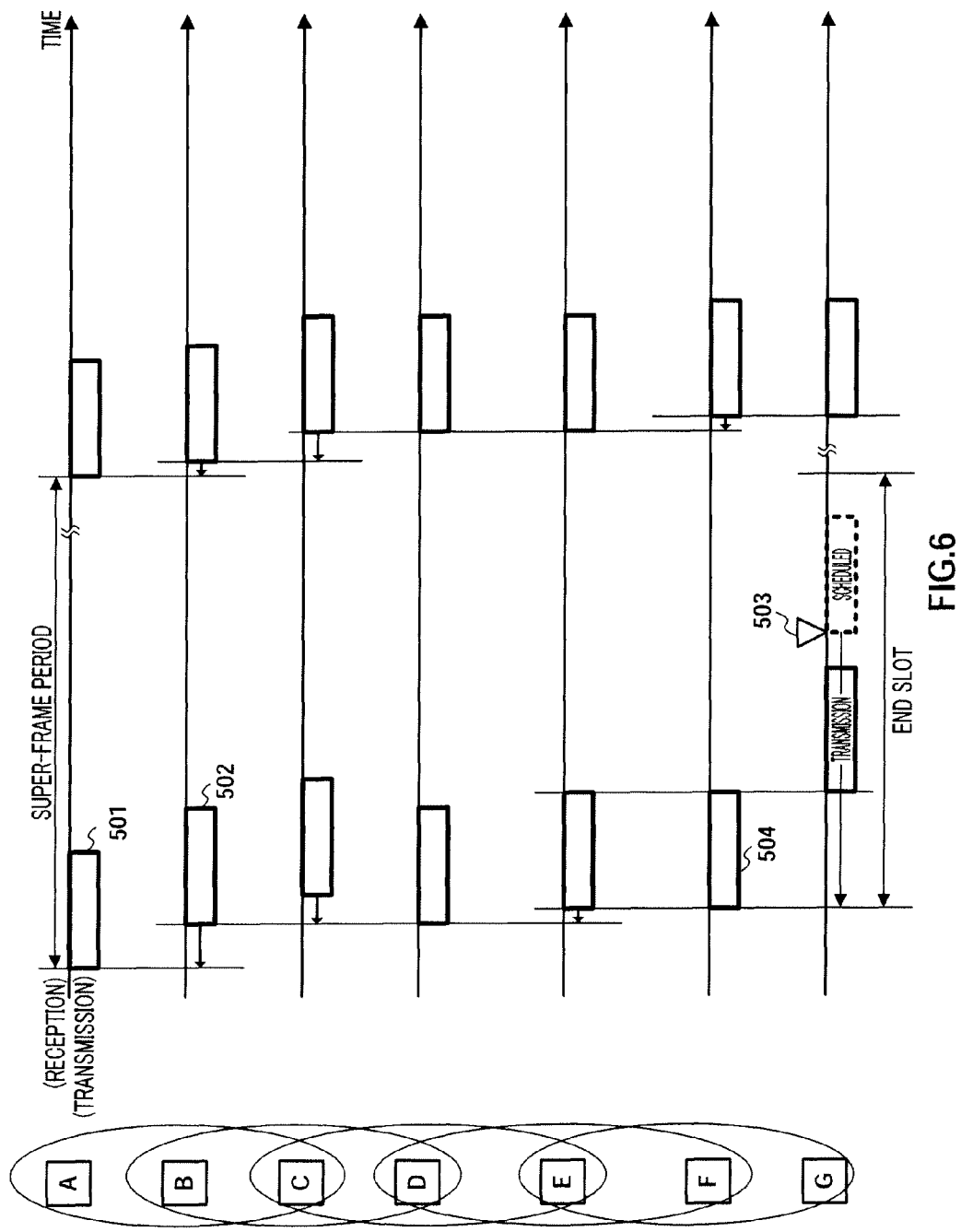
FIG. 6 is a drawing showing a super-frame synchronization operation according to Embodiment 1 of the present invention.

FIG. 6 is a drawing showing the operation whereby each radio communication apparatus of the same super-frame group synchronizes a super-frame period. The ellipses in the drawing indicate the communication capability areas of the radio communication apparatuses. Radio communication apparatus A through radio communication apparatus G are assumed to be mutually contiguous as shown in the drawing.

In FIG. 6, an upper signal of each radio communication apparatus indicates reception, and a lower signal indicates transmission.

In FIG. 6, radio communication apparatus B performs transmission of an end tone 502 at end tone sending timing of a super-frame period, but detects an end tone 501 of radio communication apparatus A before transmission of its own end tone 502, and therefore sets its own measured super-frame period start timing to super-frame period start timing 501 of radio communication apparatus A. Similarly, radio communication apparatus C synchronizes its own super-frame start time with end tone 502 of radio communication apparatus B. By this means, the delay times of radio communication apparatus B and radio communication apparatus C are gradually absorbed into the delay times specific to their own super-frame periods.

Synchronization processing is also performed in a similar way for radio communication apparatuses D through F, synchronization being performed with the super-frame of the radio communication apparatus that transmits an end tone earliest within its own communication capability area.

End tone transmission time 503 of radio communication apparatus G is after the transmission of end tone 504 of radio communication apparatus F, and therefore the radio communication apparatus G end tone is transmitted from the time at which radio communication apparatus F completes transmission of end tone 504. Then, in the next super-frame, radio communication apparatus G catches up with the super-frame start timing of the other radio communication apparatuses.

A description will now be given of super-frame re-synchronization processing in the case of mixing with another super-frame group.

In this super-frame re-synchronization processing, a radio communication apparatus performs end tone detection for super-frames as a whole, and when an end tone of another super-frame group is detected, synchronizes with a super-frame of another super-frame group that transmitted an end tone earliest.

Figure 7:
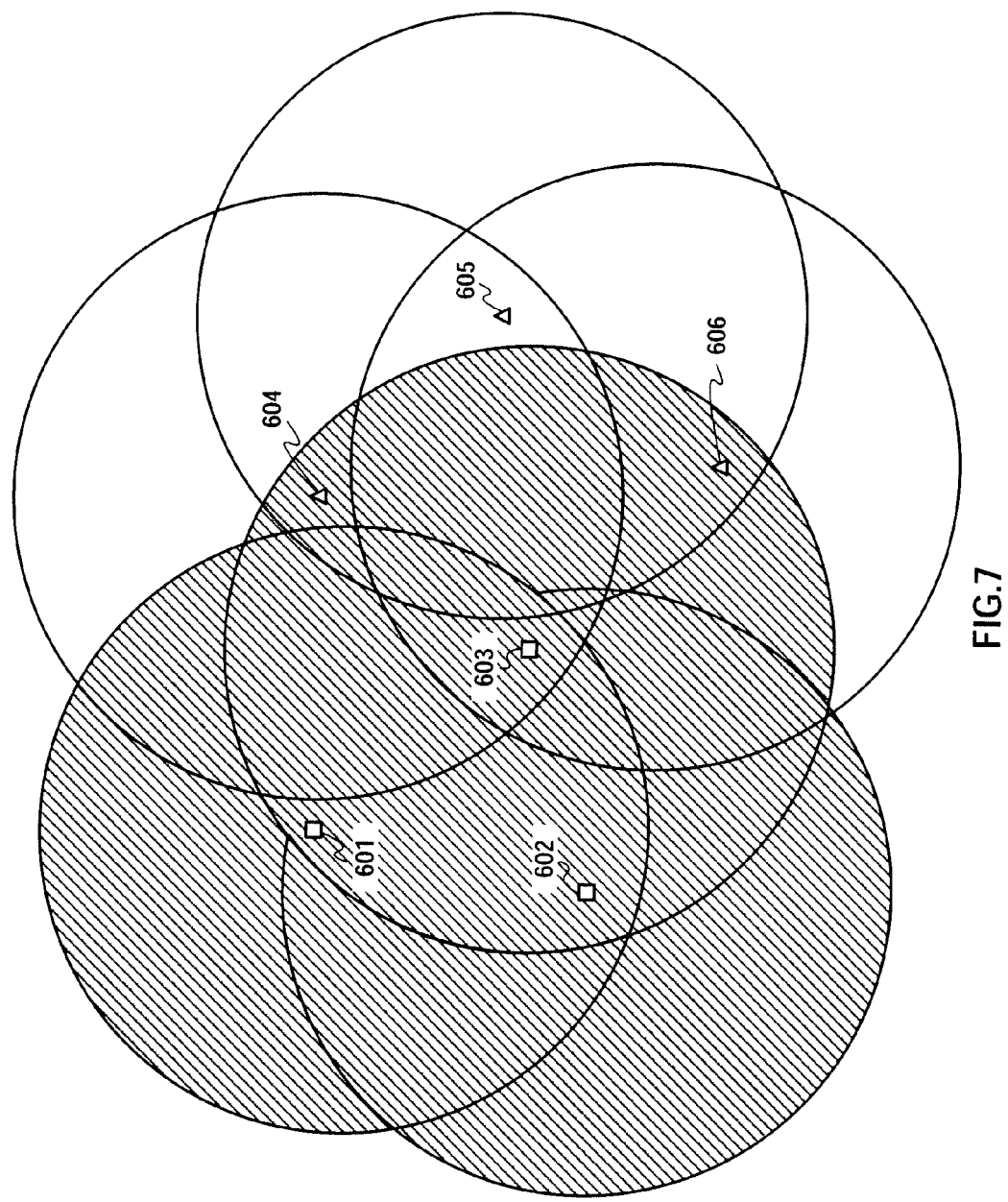
FIG. 7 is a drawing showing the arrangement of two super-frame groups according to Embodiment 1 of the present invention.

FIG. 7 is a drawing showing a case in which radio communication apparatuses 601 through 603 compose a super-frame group, and radio communication apparatuses 604 through 606 compose a separate super-frame group. In FIG. 7, radio communication apparatus 604 and radio communication apparatus 606 are within the communication capability area of radio communication apparatus 603.

If radio communication apparatus 603 detects an end tone of another super-frame group outside an end tone slot at such a time, radio communication apparatus 603 and radio communication apparatuses of the same super-frame group perform re-synchronization processing taking that as the starting point, and ultimately radio communication apparatuses 601 through 606 come to share the same super-frame.

Figure 8:
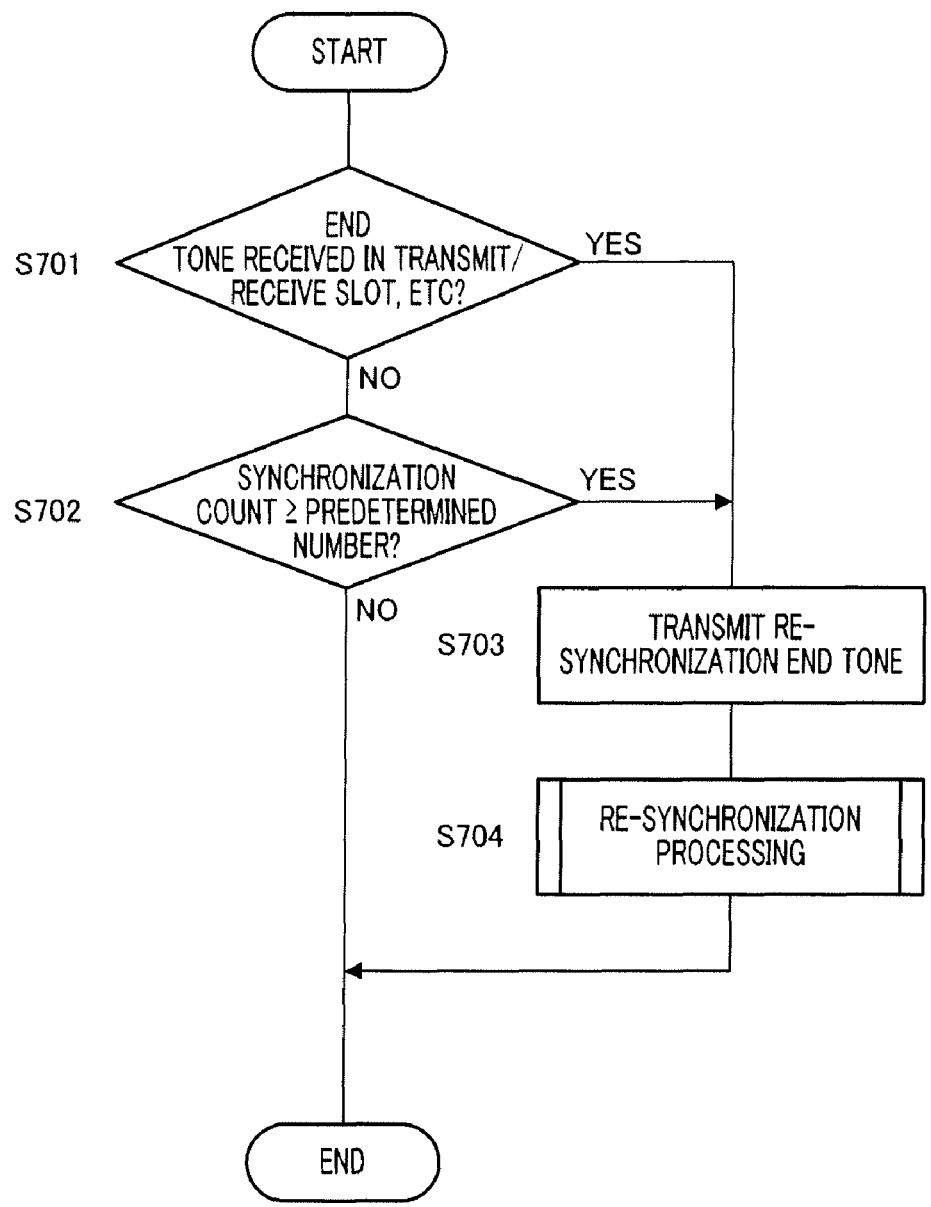
FIG. 8 is a flowchart explaining super-frame re-synchronization processing according to Embodiment 1 of the present invention.

FIG. 8 is a flowchart that determines whether or not super-frame re-synchronization processing is started at the end of end tone transmission/reception.

In FIG. 8, re-synchronization control section 133 checks whether or not the apparatus has received an end tone in a transmit/receive slot or the like in a super-frame period (step S701). If an end tone has been received, re-synchronization control section 133 checks whether or not this is a node for which the super-frame synchronization count since the apparatus finished the previous re-synchronization processing is greater than or equal to a predetermined number (designated count N) and re-synchronization is to be performed (step S702) If this synchronization count is large, the number of times reception is awaited for super-frames as a whole is reduced and a power consumption is reduced accordingly, but the start of communication with another group is delayed. Generally, a synchronization count giving a rate of around once per second is desirable. Then, if this condition is met, re-synchronization control section 133 transmits a re-synchronization end tone regardless of another node (step S703). This re-synchronization end tone is an end tone transmitted again when 10-plus microseconds have elapsed from the end of the apparatus's own super-frame group end tone transmission, and notifies another node of the start of re-synchronization processing. Following this, re-synchronization control section 133 performs re-synchronization processing (step S704). Here, re-synchronization processing is processing that performs reception of end tones to be synchronized across super-frames as a whole. A node that receives this re-synchronization end tone but whose super-frame synchronization count has not reached predetermined count N resets the super-frame count, relays the re-synchronization end tone, and enters a re-synchronization state.

If, in step S701, the apparatus has received an end tone in a super-frame, re-synchronization control section 133 transmits a re-synchronization end tone (step S703). Then, in order to synchronize speedily, re-synchronization processing is initiated (step S704). In the above example the wait time until a re-synchronization end tone is transmitted is 10-plus microseconds, but this depends on the length of the end tone. Normally, nodes of the same super-frame group do not transmit an end tone in a time period three times the length of the end tone or more, and therefore a super-frame should be transmitted after a gap of around this triple time period. However, if the distance is too great there is a possibility of an end tone of a different super-frame group being erroneously mixed with the re-synchronization end tone, and therefore this point must also be taken into consideration.

Figure 9:
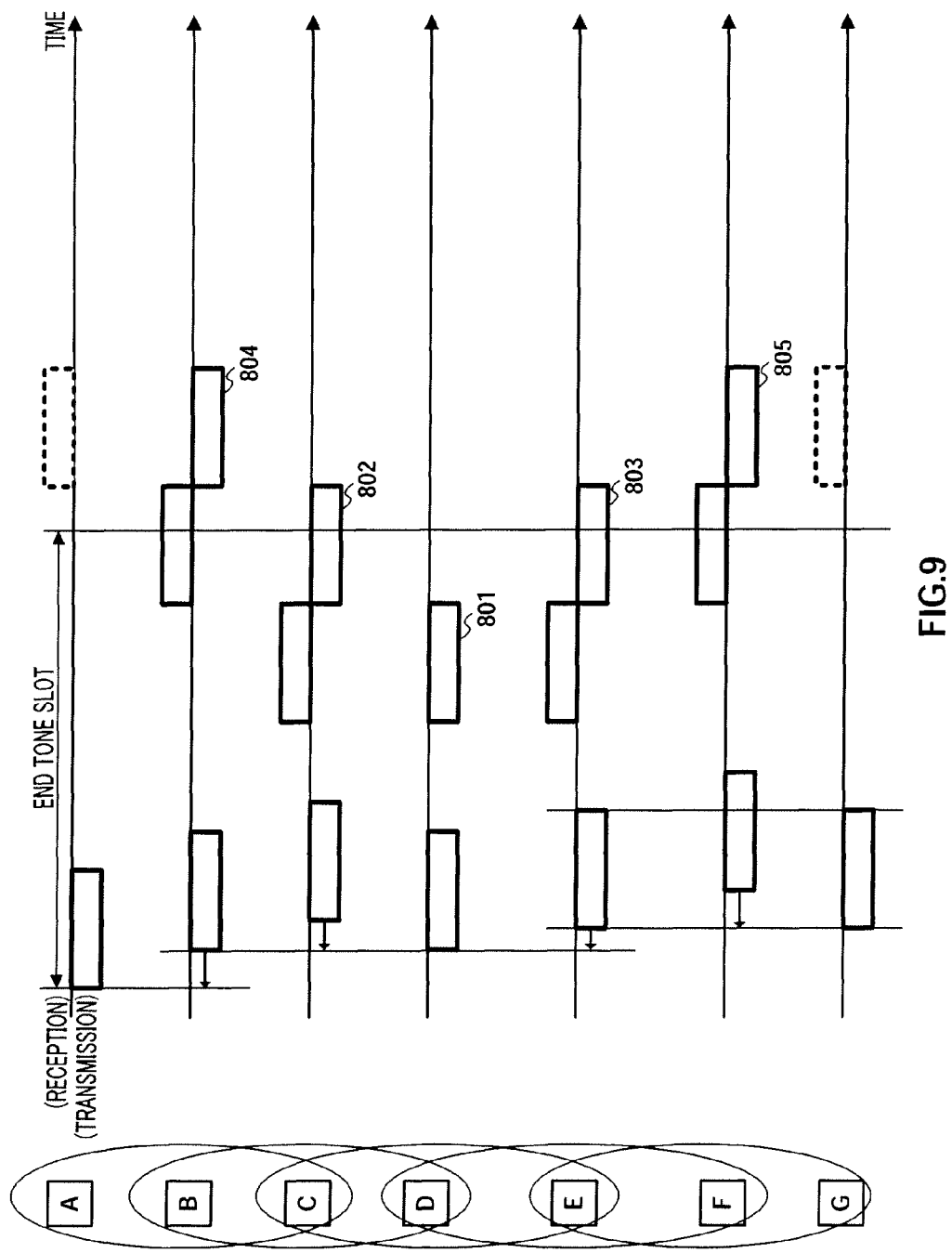
FIG. 9 is a drawing showing a re-synchronization end tone transmission/reception operation of a radio communication apparatus according to Embodiment 1 of the present invention.

FIG. 9 is a drawing showing an operation whereby a radio communication apparatus that has detected another super-frame group performs re-synchronization end tone transmission/reception. As in FIG. 6, radio communication apparatus A through radio communication apparatus G are contiguous as shown in the drawing. In FIG. 9, an upper signal of each radio communication apparatus indicates reception, and a lower signal indicates transmission. Here, radio communication apparatus D detects the existence of another super-frame group, and transmits a re-synchronization end tone 801. Peripheral super-frame group radio communication apparatuses C and E relay the received re-synchronization end tone by means of re-synchronization end tones 802 and 803. However, in the case of radio communication apparatus A and radio communication apparatus G, the end tone slot ends before those re-synchronization end tones 804 and 805 are relayed to them, and therefore radio communication apparatus A and radio communication apparatus G do not enter a re-synchronization state.

However, radio communication apparatuses A and G transmit a re-synchronization end frame in the next super-frame so as to synchronize with end tones output in synchronization by radio communication apparatuses B through F, and a single synchronization timing is achieved overall.

This concludes a description of super-frame re-synchronization processing.

Next, data transmission/reception operation will be described.

First, after generating a data frame, RTS/CTS-e data frame transmitting section 135 gives a directive for data frame transmission to frame transmitting/receiving section 131. On receiving this, frame transmitting/receiving section 131 transmits send/receive tone 205 via narrowband communication section 102. After completion of send/receive tone 205 transmission, frame transmitting/receiving section 131 transmits data in a narrowband signal via broadband communication section 101.

By this means, a node in a frame wait state always need only wait for a narrowband signal, and standby is possible with lower power consumption than when always waiting for a broadband signal.

Figure 10:
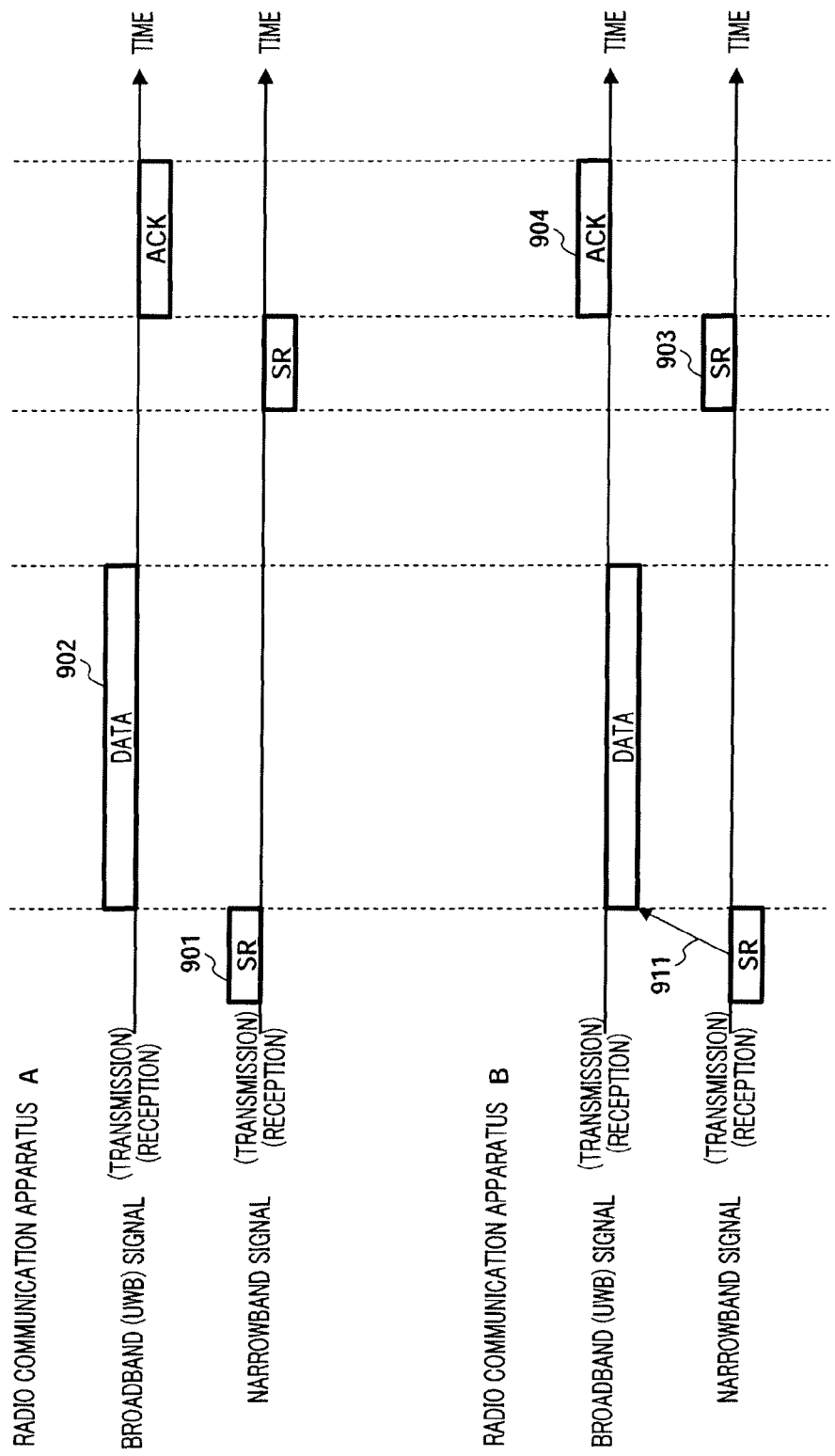
FIG. 10 is a drawing showing a data transmission/reception operation according to Embodiment 1 of the present invention.

FIG. 10 is a drawing showing this data transmission/reception operation.

Radio communication apparatus A transmits a data frame to radio communication apparatus B and receives a corresponding acknowledge frame (ACK). Both enter a reception wait state unless transmitting a narrowband signal. Radio communication apparatus A transmits a send/receive tone (SR) 901 before data 902 transmission, and on receiving this, radio communication apparatus B transits to a narrowband signal reception wait state (S911). Similarly, after radio communication apparatus B sends a send/receive tone (SR) 903, it transmits ACK 904. This send/receive tone is transmitted before transmission of any frame.

Next, a description will be given of probe processing for acquiring the communication state of a neighbor node.

When starting communication, a radio communication apparatus needs to ascertain the existence and address of the communicating party. Also, to prevent send/receive signal from colliding with a communication signal from another node, it is necessary to check the existence of neighbor nodes. For this purpose, in this embodiment the attributes, communication environment, and so forth, of a neighbor node are acquired using a probe command.

Probe slot 223 can only be used for probe transmission/reception, but its length can be changed dynamically as necessary. If there is no probe transmission request, it is also possible to terminate the probe slot at that point in time. However, with a probe slot, a radio communication apparatus can only perform transmission/reception of one set of probes in one super-frame, and therefore there is a possibility of a plurality of requests colliding. Beginning tones 1 (203, 209) and beginning tones 2 (204, 210) are used to solve this problem.

When multicasting is performed, the system is normally prepared for collision with a node located next to the neighbor node when carrying out transmission, but when beginning tones 1 and 2 are used, each node categorizes itself as a probe-request-source node, a probe response node, or a silent node in order to prevent a collision.

Figure 11A:
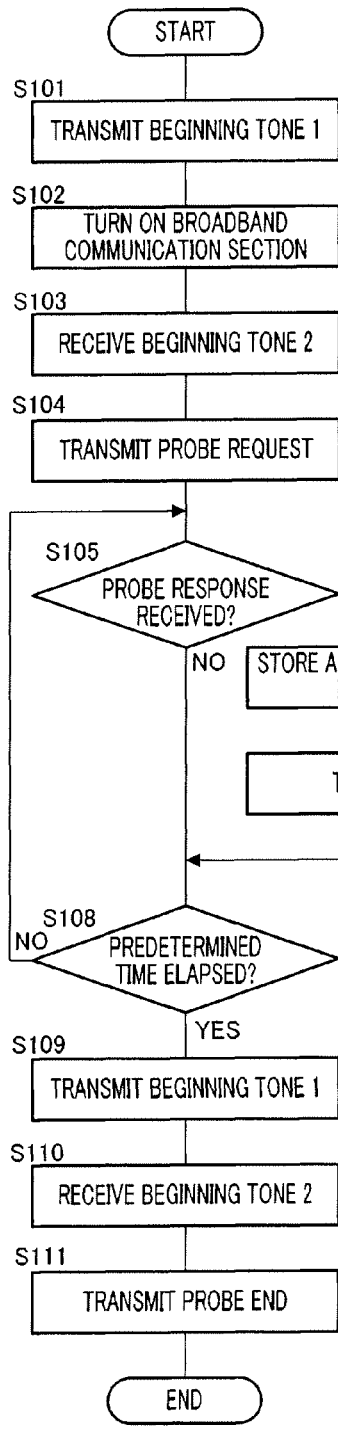
FIG. 11A is a flowchart explaining probe processing of a request-side radio communication apparatus according to Embodiment 1 of the present invention.
Figure 11B:
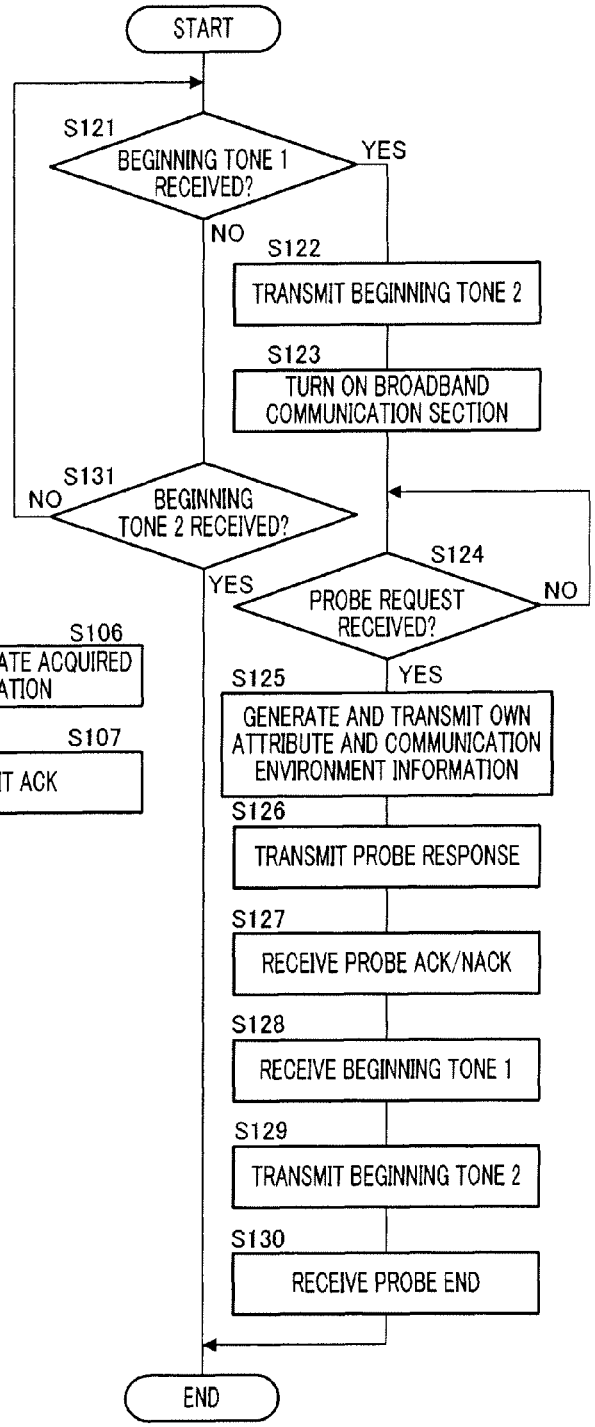
FIG. 11B is a flowchart explaining probe processing of a response-side radio communication apparatus according to Embodiment 1 of the present invention.

FIG. 11A is a flowchart explaining probe processing of a request-side radio communication apparatus, and FIG. 11B is a flowchart explaining probe processing of a response-side radio communication apparatus.

In FIG. 11A, first, probe transmitting section 137 of a probe-requesting node performs tone signal carrier sense, and when this is cleared, gives a directive for transmission of beginning tone 1 (BT1) 203 to beginning tone control section 134. Beginning tone control section 134 transmits beginning tone 1 (203) via narrowband communication section 102 at the point in time at which the end tone slot ends (step S101). At this time, narrowband communication section 102 transmits beginning tone 1. Then the node that has completed transmission of beginning tone 1 places broadband communication section 101 in the "power on" state in this probe slot (step S102), and operates as a requesting node.

On the other hand, in FIG. 11B, narrowband communication section 102 of a node not making a probe request is in a tone signal reception state, and on receiving beginning tone 1 (step S121), notifies beginning tone control section 134. Beginning tone control section 134 receives this notification and transmits beginning tone 2 (BT2) 204 (step S122). Then, this node that received beginning tone 1 places broadband communication section 101 in the "power on" and driving state in current probe slot 223 (step S123), and operates as a responding node. On receiving beginning tone 1, narrowband communication section 102 of a node planning a probe request becomes a responding node, and stops beginning tone 1 transmission.

A node that receives beginning tone 2 transmitted from a node that received beginning tone 1 (step S131) keeps broadband communication section 101 in the "power off" state during that probe slot 223 and operates as a silent node.

Next, in FIG. 11A, beginning tone control section 134 of the requesting node checks reception of beginning tone 2 (step S103), and on receiving confirmation, notifies probe transmitting section 137. Probe transmitting section 137 receives this notification and sends a probe request frame to frame transmitting/receiving section 131. Frame transmitting/receiving section 131 receives this, places broadband communication section 101 in the "power on" state, and transmits probe request (PB) 211 via broadband communication section 101 (step S104).

On the other hand, in FIG. 11B, on receiving the probe request frame (step S124), broadband communication section 101 of the responding node sends that frame to frame transmitting/receiving section 131. On determining that the received frame is a probe request, frame transmitting/receiving section 131 notifies probe receiving section 136. Probe receiving section 136 receives this notification, and generates information on its apparatus's attributes and communication environment (step S125). Then probe receiving section 136 sends a directive to frame transmitting/receiving section 131 to transmit a probe response containing these items of information. Frame transmitting/receiving section 131 receives this and transmits probe response (PR) 212 via broadband communication section 101 (step S126).

At this time, frame transmitting/receiving section 131 applies back-off and responds at random timing in order to prevent a collision with probe response (PR) 212 transmitted from another responding node. Back-off here refers to a method whereby the timing at which retransmission is performed when a collision is detected is calculated more randomly, and retransmission is performed after the elapse of the calculated time.

Before transmitting probe response 212 by means of broadband communication, frame transmitting/receiving section 131 transmits a send/receive tone 207 in the same way as in ordinary frame transmission.

In the case of a silent node, broadband communication section 101 is in the "power off" state, and therefore broadband communication section 101 does not receive a probe request or probe response.

Next, in FIG. 11A, narrowband communication section 102 of the requesting node relays send/receive tone 207 at the point in time at which it receives this send/receive tone 207. By this means, a radio communication apparatus that started a response (responding node) and a responding node on the opposite side via the probe requester can be prevented from starting to transmit response probe at the same time. As a result, normally performed collision avoidance processing by means of RTS/CTS can be greatly shortened.

Then, on receiving a probe responding frame (step S105), requesting node broadband communication section 101 sends this to frame transmitting/receiving section 131. On determining that the received frame is a probe request, frame transmitting/receiving section 131 notifies probe transmitting section 137. Probe transmitting section 137 receives this notification, and stores and updates it as neighbor node attribute and communication environment information (step S106).

Next, probe transmitting section 137 gives a directive to frame transmitting/receiving section 131 for ACK or NACK transmission as a response to the probe response. After frame transmitting/receiving section 131 sends a send/receive tone 208 via narrowband communication section 102, frame transmitting/receiving section 131 transmits an ACK or NACK frame via broadband communication section 101 (step S107).

On the other hand, in FIG. 11B, on receiving this ACK or NACK response (step S127), the responding node enters a state of waiting for reception of "probe end" giving notification of the end of the probe slot.

Also, another responding node that receives this ACK or NACK response and has not transmitted a probe response restarts a back-off countdown. Then that responding node performs probe response transmission after completion of the countdown (step S126).

On the other hand, in FIG. 11A, probe request node probe transmitting section 137 returns to step S105 until completion of the maximum back-off count started after probe request transmission (step S108), and performs reception processing of a response probe from another responding node. This maximum back-off count counts a predetermined time period in consideration of a back-off response, and probe transmitting section 137 considers a probe slot to have ended when this maximum back-off count is completed. Probe request node probe transmitting section 137 halts the same countdown as the responding node during reception of a probe response, and if a collision should occur during back-off, begins a maximum back-off countdown anew. By this means, sufficient time can be secured to enable a responding node to respond without fail, and when the number of responding nodes is small, probe termination can be performed with a correspondingly short wait time.

Following this, probe request node probe transmitting section 137 transmits a probe end frame to report the end of the probe slot. At this time, probe transmitting section 137 gives a directive for transmitting beginning tone 1 again to beginning tone control section 134. Beginning tone control section 134 transmits beginning tone 1 (209) via narrowband communication section 102 in the same way as in step S101 (step S109). By this means, a silent node with in a two-hop area can return to normal transmit/receive mode.

Then, in the same way as in step S103, when beginning tone control section 134 receives beginning tone 2 (210) (step S110), probe transmitting section 137 gives a directive for "probe end" transmission to frame transmitting/receiving section 131. Frame transmitting/receiving section 131 receives this, transmits probe end (PE) 214 via broadband communication section 101 (step S111), and terminates this probe slot.

On the other hand, in FIG. 11B, on receiving beginning tone 1 (step S128), responding node beginning tone control section 134 transmits beginning tone 2 (step S129), and after transmission is completed, frame transmitting/receiving section 131 receives probe end (214) (step S130) and regards this as the end of the probe slot. Thus, when probe processing is performed, if two or more nodes transmit beginning tone 1 within a one-hop area, one or the other can transmit by means of carrier sense, and the other(s) wait(s) for reception.

Probe operations will now be described using an actual example.

FIG. 12 shows beginning tone 1 and 2 transmission/reception operations when radio communication apparatuses A through D are located within two hops.

Figure 12A:
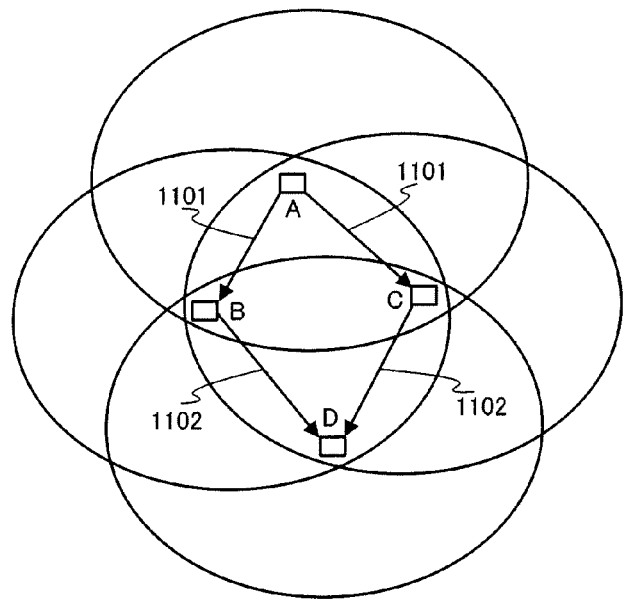
FIG. 12A is an arrangement drawing of a case in which radio communication apparatuses according to Embodiment 1 of the present invention are located within two hops.
Figure 12B:
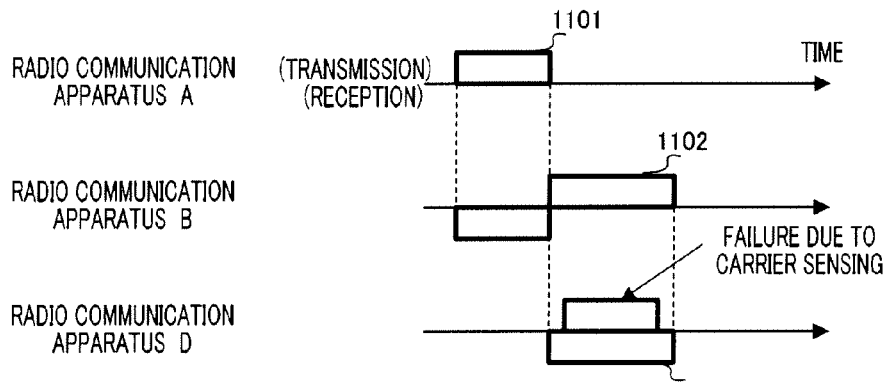
FIG. 12B is a drawing showing beginning tone 1 and 2 transmission/reception operations of radio communication apparatuses according to Embodiment 1 of the present invention.

In FIG. 12A, radio communication apparatus A and radio communication apparatus D are assumed to be nodes that make probe requests. At this time, as shown in FIG. 12B, radio communication apparatus A first transmits a beginning tone 1 (1101), and after transmission of that beginning tone 1 is completed, radio communication apparatus D prepares to transmit beginning tone 1 and performs carrier sense. In this case, since radio communication apparatuses B and C are already transmitting a beginning tone 2 (1102) in response to beginning tone 1 (1101) from radio communication apparatus A, radio communication apparatus D receives beginning tone 2 (1102) during carrier sense or before carrier sense, and therefore makes itself a silent node. Therefore, radio communication apparatus A acquires the probe request transmission right.

Figure 12C:
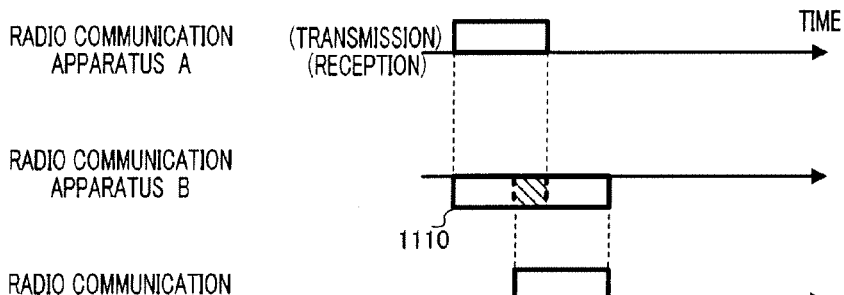
FIG. 12C is a drawing showing beginning tone 1 and 2 transmission/reception operations of radio communication apparatuses according to Embodiment 1 of the present invention.

Next, as shown in FIG. 12C, when beginning tone 1 transmission by radio communication apparatus A and beginning tone 1 transmission by radio communication apparatus D are performed with a difference of the duration of beginning tone 1 or less, radio communication apparatuses B and C receive a tone signal 1110 longer than the duration of beginning tone 1 and shorter than the duration of an end tone. Consequently, radio communication apparatuses B and C determine the received tone signal to be beginning tone 2. Therefore, radio communication apparatuses B and C become silent nodes, and do not give a response in the current probe slot. Radio communication apparatuses B and C cannot participate in probe processing, but do not interfere with radio communication apparatus A and D communications due to becoming silent nodes.

Thus, by means of probe processing using beginning tones 1 and 2 of the present invention, each radio communication apparatus can become an appropriate node (requesting node, responding node, or silent node) in a probe slot.

Next, operations when two or more nodes perform probe requests within a three-hop area will be described.

FIG. 13 shows beginning tone 1 and 2 transmission/reception operations when radio communication apparatuses A through E are located within three hops.

Figure 13A:
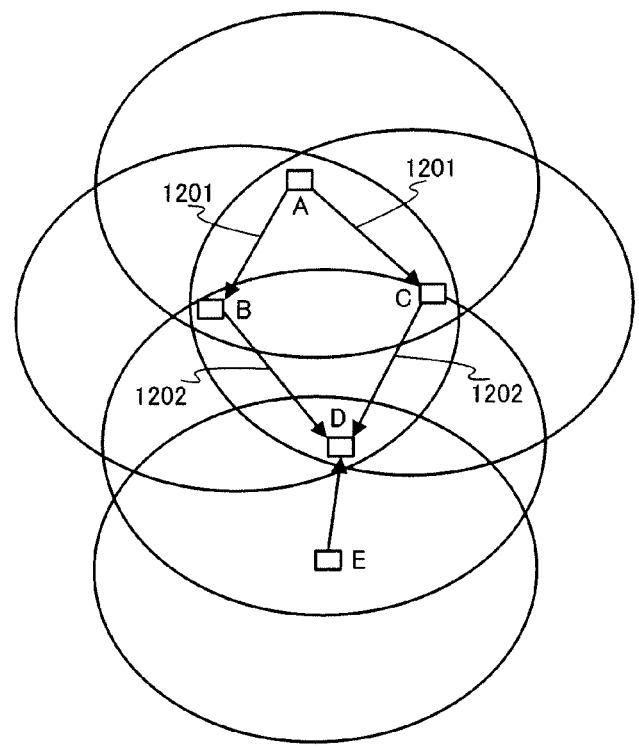
FIG. 13A is an arrangement drawing of a case in which radio communication apparatuses according to Embodiment 1 of the present invention are located within three hops.
Figure 13B:
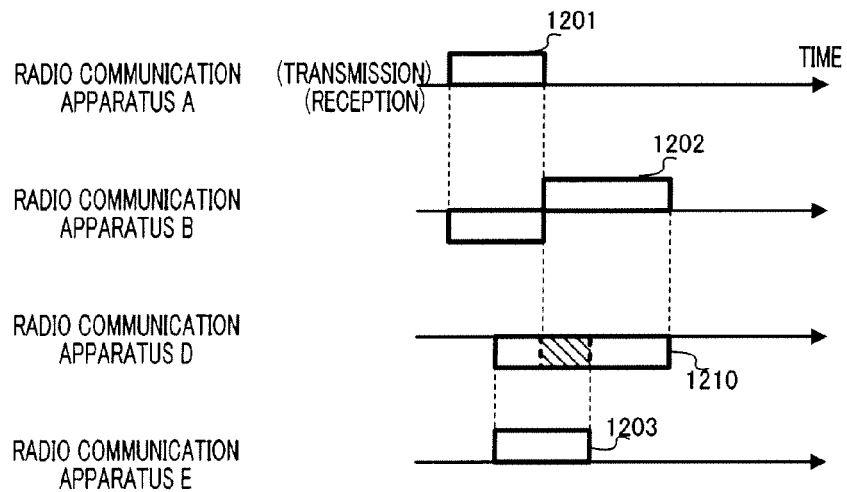
FIG. 13B is a drawing showing beginning tone 1 and 2 transmission/reception operations of radio communication apparatuses according to Embodiment 1 of the present invention.

In FIG. 13A, radio communication apparatuses A and E are assumed to be nodes that make probe requests. At this time, as shown in FIG. 13B, radio communication apparatus A first transmits a beginning tone 1 (1201), and at timing prior to completion of transmission of that beginning tone 1, a beginning tone 1 (1203) is transmitted from radio communication apparatus E. In this case, radio communication apparatuses B and C receive beginning tone 1 (1201) only from radio communication apparatus A, and therefore transmit a beginning tone 2 (1202) in response thereto. Therefore, radio communication apparatus D starts receiving beginning tone 2 (1202) during reception of beginning tone 1 (1203) from radio communication apparatus E, and so receives a tone signal 1210 longer than the duration of beginning tone 1 and shorter than the duration of an end tone. Consequently, radio communication apparatus D determines the received tone signal to be beginning tone 2, and becomes a silent node.

Thus, according to probe processing of the present invention, even if a plurality of probe processing occurs virtually simultaneously, one probe processing is allowed to succeed, and the other probe request node is silenced, enabling both probe requests to proceed smoothly without colliding.

Only one probe request is executed in a probe slot, but a silent node may also receive a plurality of beginning tones 2. In this case, the silent node cannot return to the normal standby state unless beginning tone 2, which is to be received before "probe end" is transmitted, is received the number of times beginning tone 2 is received. If two beginning tones 2 are not received for some reason, the silent node remains silent for the maximum back-off count period.

The above description is summarized in FIG. 14 and FIG. 15.

FIG. 14 and FIG. 15 show operations of a radio communication apparatus according to the present invention when a tone signal is received.

In FIG. 14 and FIG. 15, each row shows a super-frame slot, and each column shows a received tone signal. For example, it is shown that when beginning tone 1 is received in a probe slot before probe request reception, beginning tone 2 is transmitted, and broadband signal synchronization is started to receive a probe request.

According to the present invention, a MAC protocol can be used that is restricted so that only an apparatus that performs transmission/reception transmits a beacon or suchlike management command frame. That is to say, an apparatus that does not perform transmission/reception need not transmit a beacon or the like as a sleep state mode.

Furthermore, according to this embodiment, RTS/CTS is a method that extends conventional RTS/CTS (the RTS/CTS-e method).

With the RTS/CTS method, originally a radio communication apparatus transmits data using the band immediately after transmitting the relevant command frame, but in this embodiment, a data transmission time period is reserved by specifying a time up to a specifiable time (for example, 64 ms). This provides a substitute for TDMA time reservation.

Also, when a radio communication apparatus performs reservations consecutively, a slot for the next RTS/CTS-e exchange is also reserved. By this means, it is also possible to support isochronous communication and so forth.

In this embodiment, the RTS/CTS-e method is a 4-way handshake method. That is to say, in the initial handshake, free time of the communicating party is confirmed, and in the next RTS/CTS-e handshake the actual transmission time is confirmed and reported in the surrounding area.

The reason for using this 4-way method is that suppressing RTS/CTS-e updating by another radio communication apparatus with an NAV (Network Allocation Vector) enables the latest communicating-party schedule at the present point in time to be confirmed.

Reserved time specification methods are actual time specification and slot specification in line with synchronization timing. With the slot specification method, by adding time up to the start time of one's own next super-frame period, determination of a slot position is possible even in the event of a collision with another super-frame group. Then, a collision with another super-frame group can be avoided by prohibiting the use of one's own super-frame group slot position corresponding to a slot of that other super-frame group.

Thus, as compared with the actual time specification method, the slot specification method enables the amount of data communicated to be reduced, but on the other hand incurs the possibility of taking more time than necessary. However, it does not matter which of the specification methods is used.

Using millimeter wave UWB enables directivity to be utilized. That is to say, frame transmitting/receiving section 131 transmits a series of tone signals and RTS/CTS frames by means of a non-directional radio wave. Then, when performing actual data, ACK, or suchlike transmission, frame transmitting/receiving section 131 predicts the direction of arrival of a radio wave when RTS/CTS is received, and when actually transmitting data, transmits or receives a directional radio wave in the predicted direction of arrival.

Figure 16:
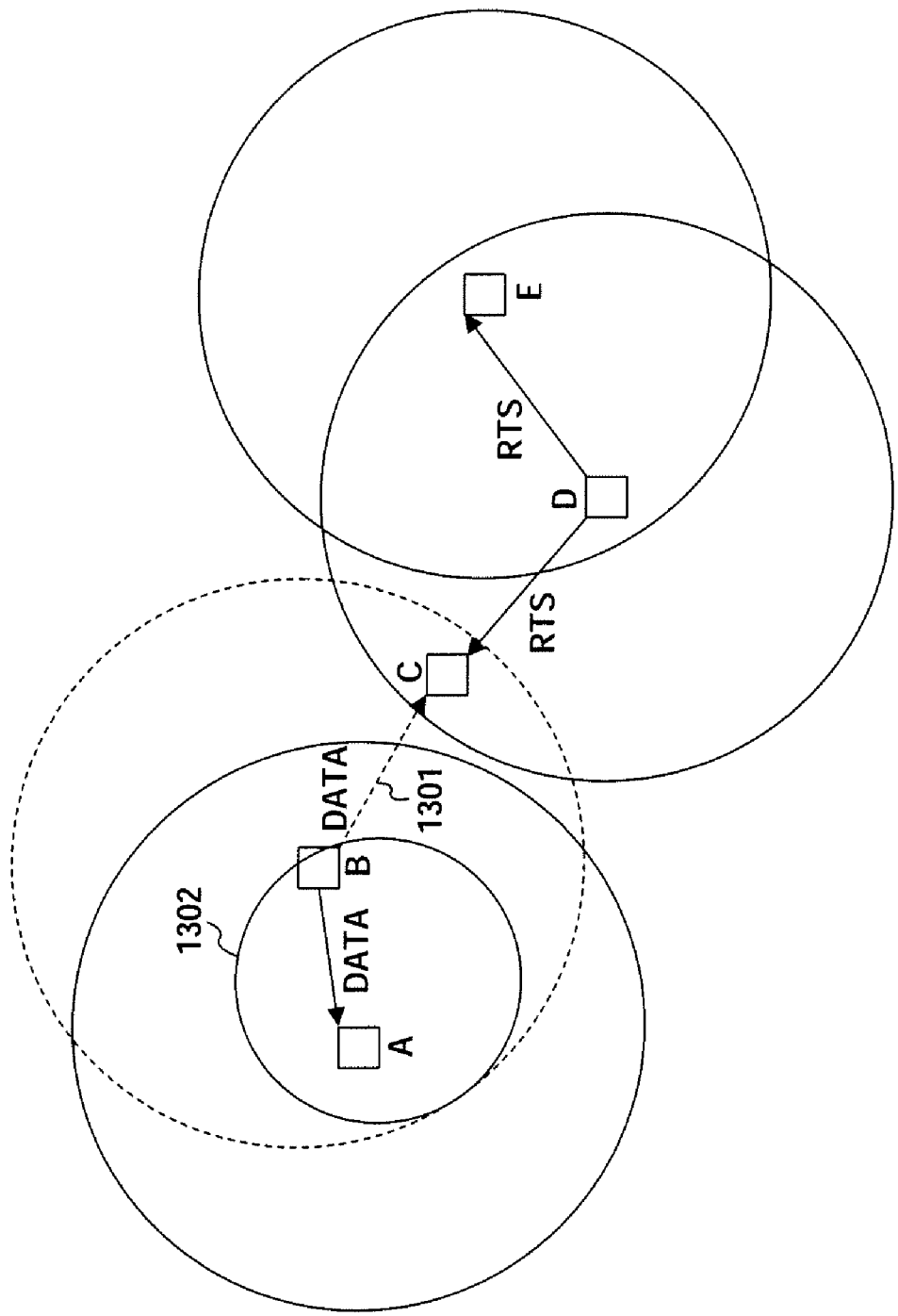
FIG. 16 is a drawing explaining collision avoidance by means of RTS/CTS according to Embodiment 1 of the present invention.

FIG. 16 is a drawing explaining collision avoidance when a radio communication apparatus transmits RTS/CTS by means of a non-directional radio wave and estimates the direction of arrival of RTS/CTS for data exchange.

In FIG. 16, if radio communication apparatus B transmits data by means of a directional radio wave when radio communication apparatus D is transmitting RTS by means of a non-directional radio wave, communication area 1302 of radio communication apparatus B does not include radio communication apparatus C. Therefore, data radio wave 1301 does not reach radio communication apparatus C, and does not interfere with RTS reception.

By having a beacon or RTS/CTS-e exchange not performed other than by a radio communication apparatus that performs transmission/reception in this way, unnecessary transmission/reception in a mobility environment can be avoided. Furthermore, it also becomes possible to start communication at any time while constantly checking surrounding radio communication apparatuses.

For tone signals of this embodiment, individual tones have been identified by differences in duration, but this is not a limitation, and the same kind of effect can also be achieved by means of differences in frequency, relative magnitudes of field strength, temporal fluctuations in field strength, intermittent signal patterns, and so forth.

As described above, according to the present invention, by using a tone signal instead of a beacon it is possible for a radio communication apparatus to perform time adjustment within a super-frame without performing frequent beacon arrangement in a mobility environment. By this means, a radio communication apparatus can perform probe requests and responses vis-à-vis another radio communication apparatus in a minimal time. Also, since only a communicating radio communication apparatus need place its broadband communication section in the "power on" state, much time can be spent in the sleep state.

Also, with a radio communication apparatus of the present invention, a tone signal, which is a narrowband signal, is transmitted before transmitting a broadband signal that communicates a command or data, and therefore only a narrowband signal reception wait state need be used. It is therefore possible for a radio communication apparatus to keep standby power consumption low compared with a case in which a broadband signal is constantly energized (power on).

Embodiment 2

Figure 17:
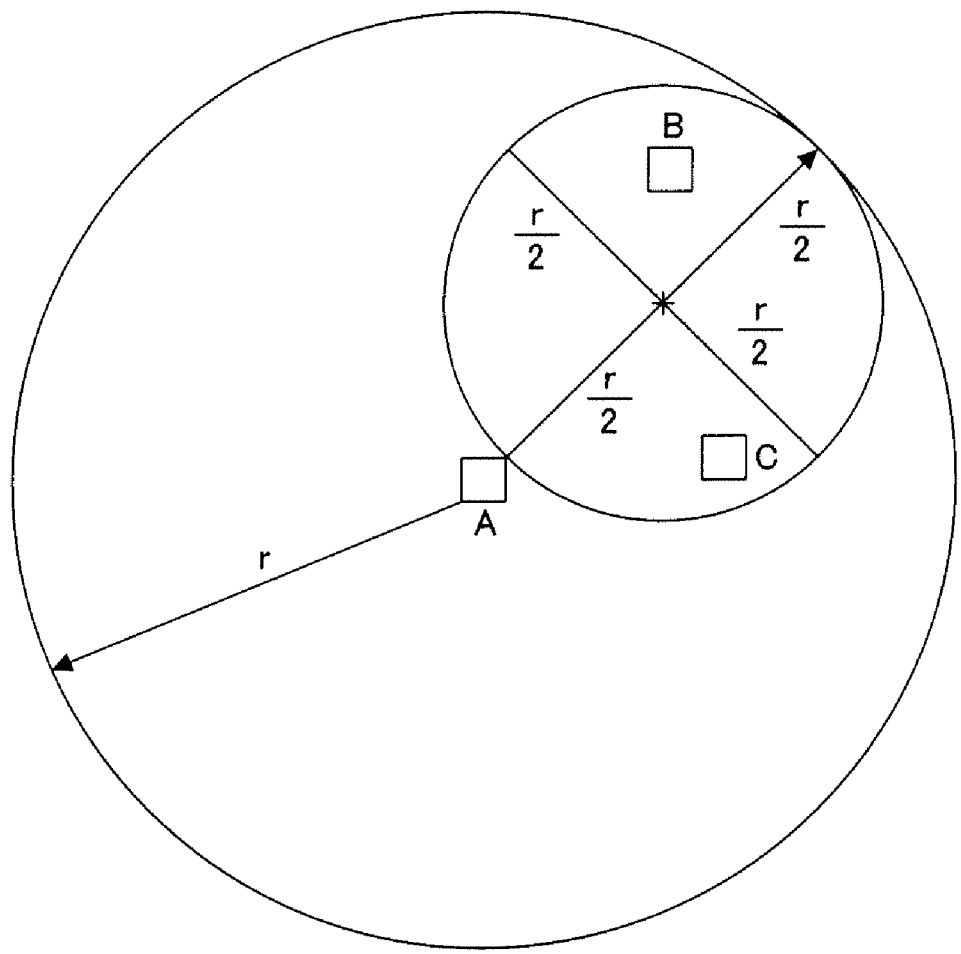
FIG. 17 is a block diagram showing an arrangement of radio communication apparatuses according to Embodiment 2 of the present invention.

A radio communication apparatus according to this embodiment transmits a probe request, or returns a response, by means of a directional antenna to all surrounding nodes. The configuration of a radio communication apparatus according to this embodiment is identical to the configuration according to Embodiment 1, but the directional antenna communication range must be an area that allows all nodes of the probe request frame coverage area to communicate with each other. For example, when the directional antenna coverage area is an area of radius r, as shown in FIG. 17, a state is established in which arbitrary nodes B and C within a circle of radius r/2 and with its center at a point r/2 in the direction in which the antenna is facing can perform mutual transmission and reception. When a radio communication apparatus in such an arrangement issues a probe request, a response thereto can achieve collision avoidance by means of normal carrier sensing.

A radio communication apparatus according to this embodiment is more suited to an access point whose orientation is fixed than to a mobile communication terminal whose orientation changes.

Probe request and response operations of radio communication apparatuses configured in this way will now be described.

Probe request/response operations according to this embodiment differ from Embodiment 1 in that, after a probe request node has transmitted beginning tone 1 to all neighbor nodes, it makes probe requests on a sector-by-sector basis.

First, a probe request node transmits beginning tone 1 in the same way as with an ordinary probe. On the other hand, a responding node transmits beginning tone 2. Then the probe request node declares that this is a sector probe, and reports that a probe request has started. Next, the probe request node transmits only a send/receive tone with directivity narrowed down to each sector. A peripheral responding node that receives such a send/receive tone with no data starts a back-off counter and returns its response randomly. The probe request node measures the maximum back-off time assigned to each sector, and after searching all sectors, transmits beginning tone 1 again and then transmits "probe end".

As described above, according to the present invention a sector probe narrows down the range in which transmission is performed compared with an ordinary probe, enabling the possibility of a collision to be eliminated by means of carrier sensing alone. Also, since the communication range is narrow, a maximum back-off count and the like can be limited, resulting in the possibility of probe responses converging at high speed.

As with an ordinary probe request, only one sector probe is executed in a probe slot, but a silent node may also receive a plurality of beginning tones 2. In this case, the silent node cannot return to the normal standby state unless beginning tone 2, which is to be received before "probe end" is transmitted, is received the number of times beginning tone 2 is received. If two beginning tones 2 are not received for some reason, the silent node remains silent during the maximum back-off count.

Embodiment 3

A radio communication method according to this embodiment uses a send/receive tone and end tone in the same way as in Embodiment 1, but differs in not using beginning tones 1 and 2.

Figure 18:
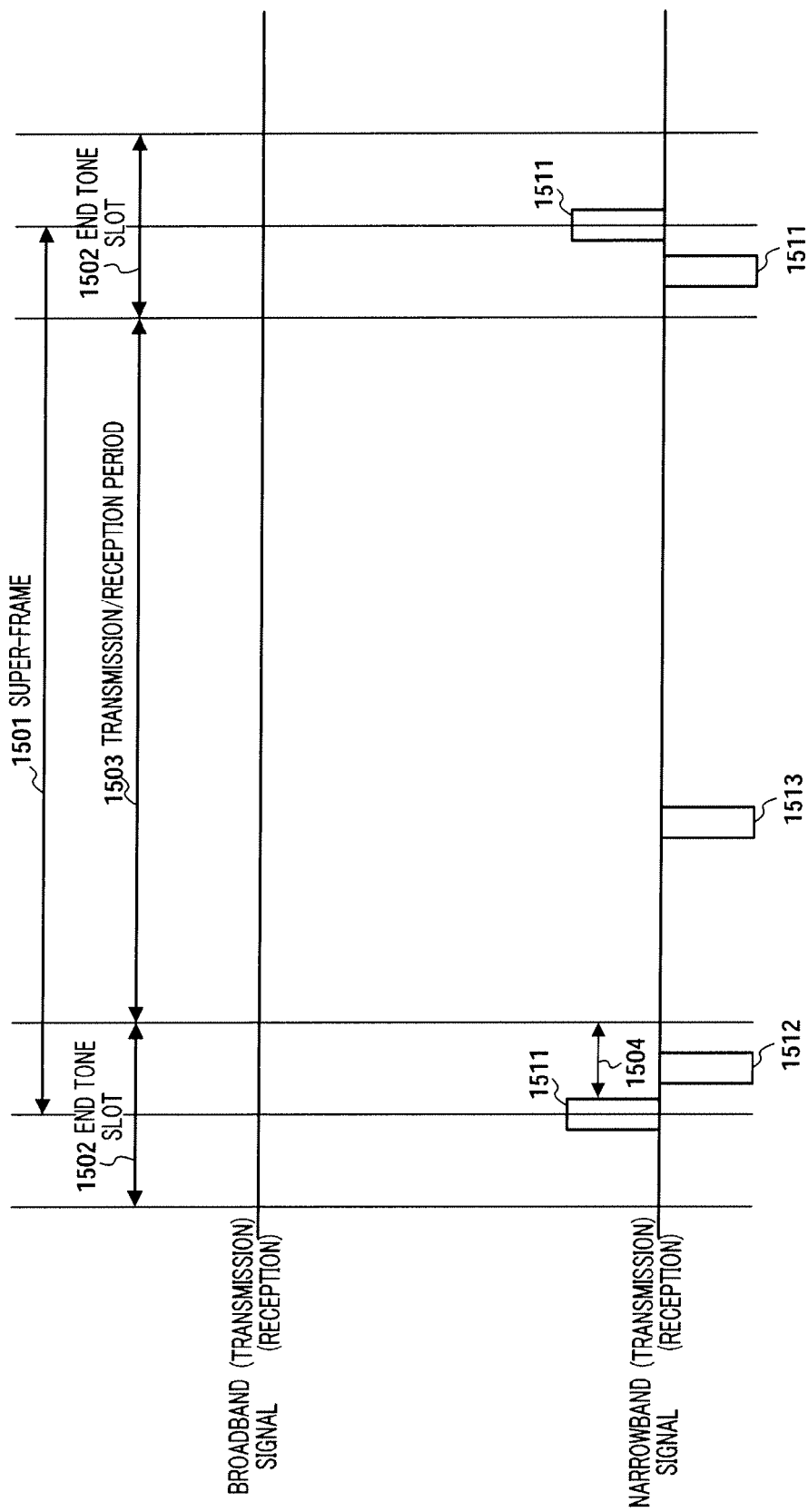
FIG. 18 is a timing chart explaining the super-frame tone signals and frame according to Embodiment 3 of the present invention.

FIG. 18 is a timing chart explaining the super-frame tone signals and frame according to this embodiment.

In FIG. 18, a super-frame 1501 is composed of end tone slots 1502 and a transmission/reception period 1503. There are only two tone signals—an end tone 1511 and a send/receive tone 1513—and a send/receive tone 1512 transmitted in an end tone re-synchronization slot 1504, which is a special time period after an end tone is transmitted, is given a special designation of "probe tone".

A send/receive tone, when received by transmission/reception period 1503, gives notification of transmission/reception of a command or data frame by means of a broadband signal in the same way as in Embodiment 1. However, send/receive tone 1512 received after end tone reception in an end tone slot gives notification that a broadband signal reception wait state is to be set and an RTS/CTS-e control frame is to be acquired in the next super-frame. Then the radio communication apparatus transmits a probe response at random timing in the next super-frame in which a control frame is acquired.

End tone processing is the same as in Embodiment 1.

Figure 19:
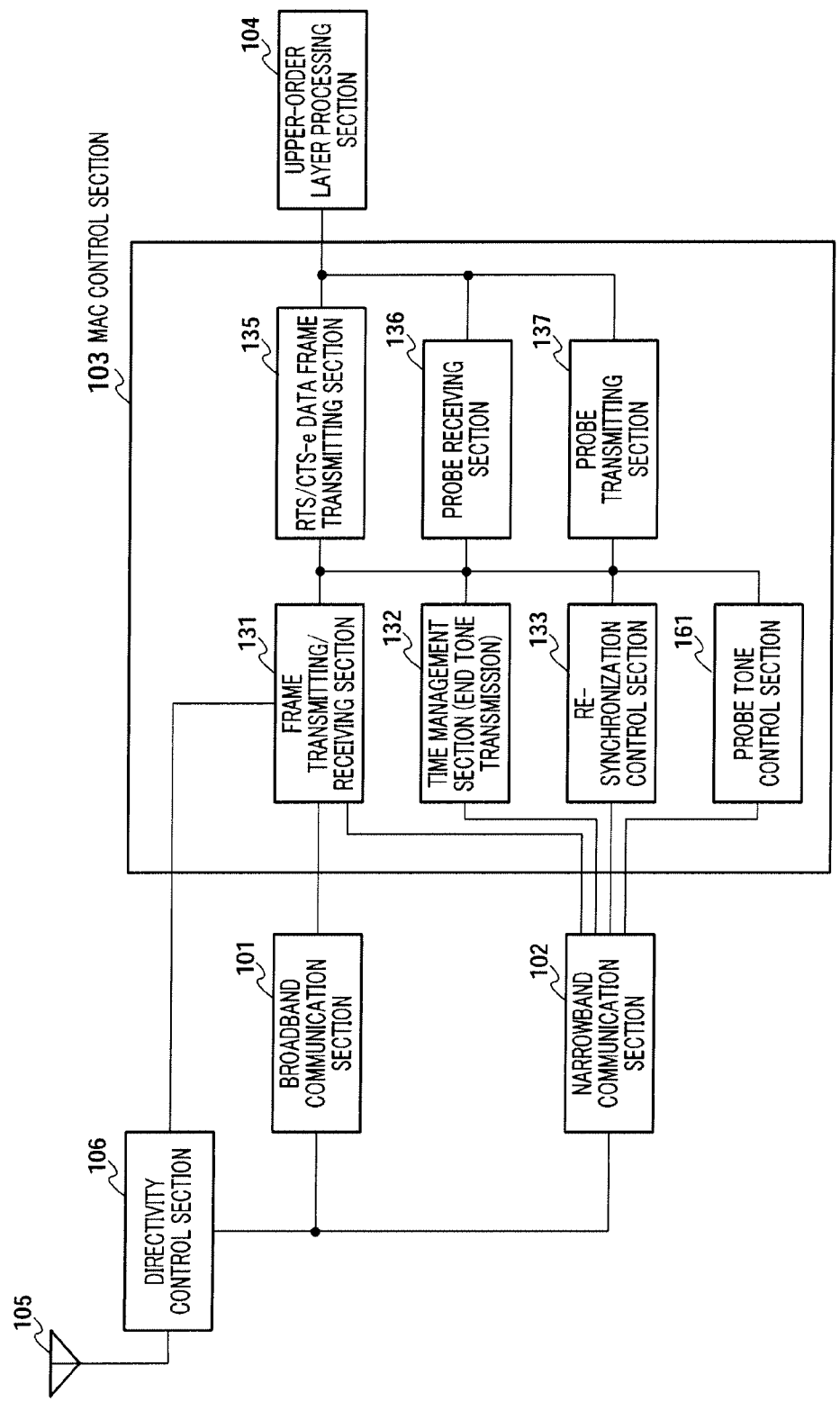
FIG. 19 is a drawing showing the configuration of a radio communication apparatus according to Embodiment 3 of the present invention.

FIG. 19 is a configuration diagram showing the configuration of a radio communication apparatus according to this embodiment. The configuration in this embodiment differs from that of Embodiment 1 shown in FIG. 2 in having a probe tone control section 161 instead of beginning tone control section 134.

On receiving a probe tone signal from another radio communication apparatus, probe tone control section 161 directs frame transmitting/receiving section 131 to perform RTS/CTS-e frame reception in that super-frame. Also, when probe transmitting section 137 receives an inquiry concerning the surrounding situation from upper layer processing section 104, probe tone control section 161 is directed to transmit a probe tone from probe transmitting section 137. Then probe tone control section 161 causes narrowband communication section 102 to transmit a send/receive tone—that is, a probe tone—after the end tone.

Operations whereby radio communication apparatuses having the above configuration make a probe request and a response thereto will now be described.

Figures 20A, 20B:
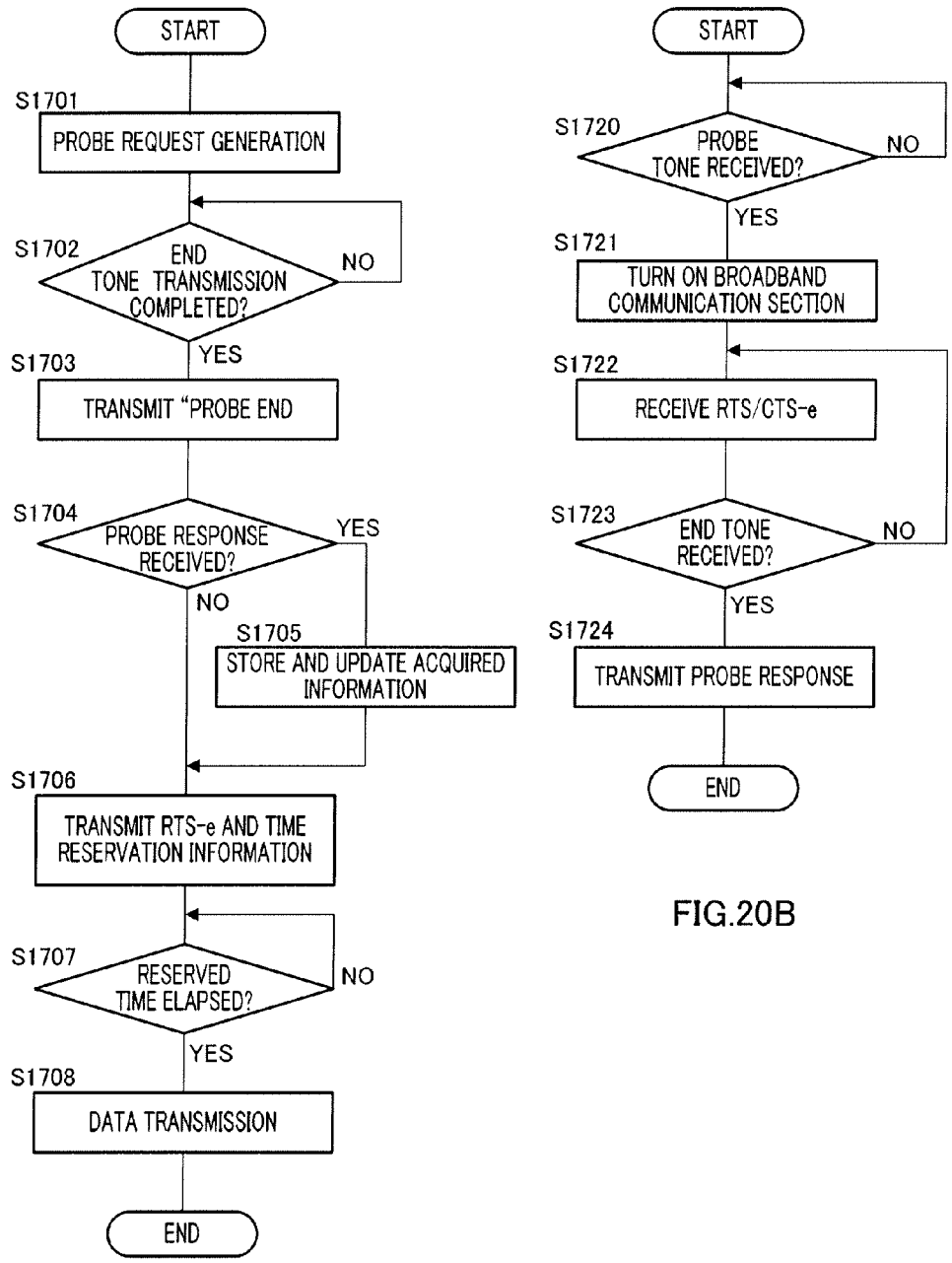
FIG. 20A is an operation flowchart of a probe-request-source radio communication apparatus according to Embodiment 3 of the present invention.
FIG. 20B is an operation flowchart of a probe-responding radio communication apparatus according to Embodiment 3 of the present invention.

FIG. 20A is an operation flowchart of a probe-request-source radio communication apparatus according to Embodiment 3 of the present invention, and FIG. 20B is an operation flowchart of a probe-responding radio communication apparatus.

In FIG. 20A, first, when probe transmitting section 137 receives an inquiry concerning the surrounding situation from upper layer processing section 104, it recognizes probe request generation (step S1701), and directs probe tone control section 161 to transmit a probe tone. Probe tone control section 161 receives this and, after end tone transmission (step S1702), transmits send/receive tone 1512—that is, a probe tone—via narrowband communication section 102 (step S1703).

Following this, after time management section 132 transmits an end tone, broadband communication section 101 is turned on, a probe response frame reception wait state is entered (step S1704). Then, when broadband communication section 101 receives a probe response frame, frame transmitting/receiving section 131 stores and updates acquired transmitting radio communication apparatus information such as attributes and communication environment (step S1705).

Next, if the communicating party matches the attributes of this apparatus, RTS/CTS-e data frame transmitting section 135 transmits time reservation information until the start of RTS-e command and data transmission in order to start transmission/reception (step S1706).

Following this, when the reserved time has elapsed (step S1707), RTS/CTS-e data frame transmitting section 135 transmits a data frame (step S1708). In steps S1705 through S1708, processing is performed in parallel by receiving probe requests from a plurality of radio communication apparatuses.

On the other hand, in FIG. 20B, when a radio communication apparatus receives a probe tone (step S1720) it becomes a responding node, and turns on broadband communication section 101 (step S1721). Then broadband communication section 101 enters a broadband signal reception wait state during that super-frame, and receives an RTS/CTS-e frame transmitted by another radio communication apparatus (step S1722).

Then, when time management section 132 receives an end tone (step S1723) and the next super-frame begins, probe receiving section 136 generates attribute, communication environment, and suchlike information for making a probe response, and gives a directive for probe response transmission to frame transmitting/receiving section 131. Frame transmitting/receiving section 131 starts a back-off count in the transmission/reception period, and transmits a probe response frame in an empty slot (step S1724).

Thus, according to the present invention, since a probe response node completes reception during one super-frame, which is the maximum time for which RTS/CTS-e reception can be reserved by RTS/CTS-e, a probe request node and probe response node can start RTS/CTS-e sequence immediately. Also, in a radio communication method according to this embodiment, since a probe slot is not provided, that time can also be used for data transmission/reception. Furthermore, since a beginning tone is not used, it is also possible to shorten an end tone.

In this embodiment, individual tones in tone signals have been identified by differences in duration, but this is not a limitation, and the same kind of effect can also be achieved by means of differences in frequency, relative magnitudes of field strength, temporal fluctuations in field strength, intermittent signal patterns, and so forth.

Embodiment 4

A radio communication apparatus according to this embodiment is a mobile file exchange apparatus incorporating a MAC protocol that implements the radio communication method of Embodiment 3. Exchanged files are music files, video files, and game software.

Figure 21:
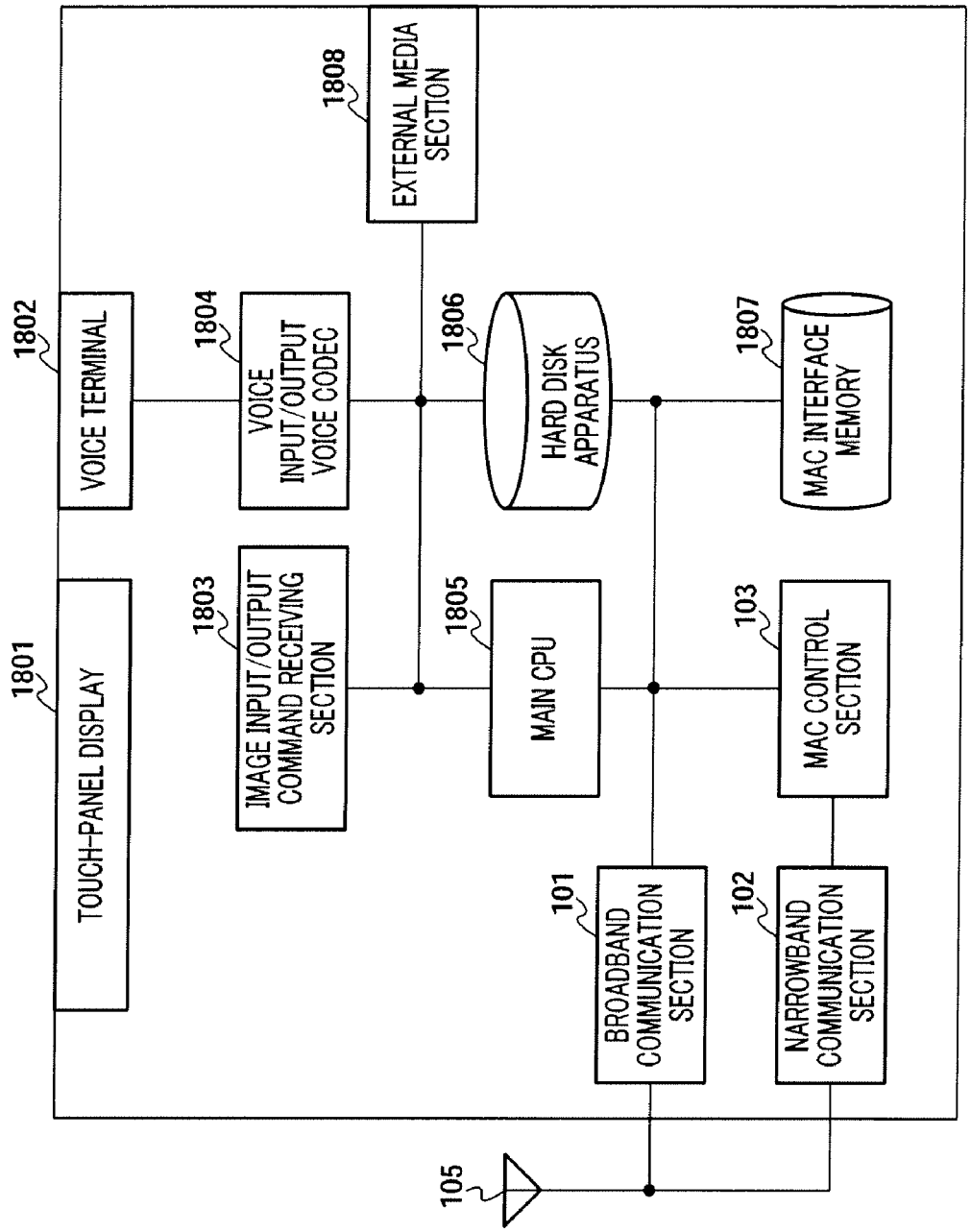
FIG. 21 is a drawing showing the configuration of a mobile file exchange apparatus according to Embodiment 4 of the present invention.

FIG. 21 is a configuration diagram of a mobile file exchange apparatus according to this embodiment.

In FIG. 21, a mobile file exchange apparatus has a touch-panel display 1801, a voice terminal 1802, an image input/output command receiving section 1803, a voice input/output voice codec 1804, a main CPU 1805, a hard disk apparatus 1806, MAC interface memory 1807, an external media section 1808, a broadband communication section 101, a narrowband communication section 102, a MAC control section 103, and an antenna 105.

Broadband communication section 101, narrowband communication section 102, MAC control section 103, and antenna 105 are identical to those described in Embodiment 2.

The operation of this mobile file exchange apparatus will now be described.

First, music software, video software, and game software playback operations will be described.

First, a user installs the software he wishes to use from external media section 1808, and stores it in hard disk apparatus 1806. Then a command input from touch-panel display 1801 is converted to a plurality of signals by image input/output command receiving section 1803, and then conveyed to main CPU 1805.

When a music playback command is input, main CPU 1805 gives a directive to voice input/output voice codec 1804, which decodes music software from hard disk apparatus 1806 and outputs it from voice terminal 1802.

When a command that executes video or a game is input, in addition to voice playback, main CPU 1805 displays video on touch-panel display 1801 via image input/output command receiving section 1803.

Next, an operation whereby music software, video software, or game software file exchange is performed with another mobile file exchange apparatus will be described.

First, in order to start a millimeter wave UWB (broadband signal) communication procedure when beginning file exchange, on receiving a start command from main CPU 1805, MAC control section 103 causes narrowband communication section 102 to search for an end tone. Then, when narrowband communication section 102 detects an end tone, re-synchronization processing is started that performs synchronization with the first end tone detected.

Next, when MAC control section 103 receives a probe tone, narrowband communication section 102 enters an RTS/CTS-e control frame reception wait state in order to transmit a probe response. Then broadband communication section 101 transmits a response randomly in the super-frame one super-frame later.

Then narrowband communication section 102 transmits an end tone for end tone re-synchronization once in N times. Count N depends on the super-frame period time, but a count that gives a 1-to-2-second period is suitable. Counting is performed from the time of joining in the case of a node that newly joins a super-frame group, and from execution of the previous super-frame group re-synchronization processing in the case of other nodes. These nodes enter an end tone reception wait state during re-synchronization processing, and are synchronized at the timing at which a new end tone is received.

If a probe tone has not been transmitted and received even once within a predetermined number of end tones, or in the case of addition to a new super-frame group through end tone re-synchronization processing, each node transmits a probe tone. Each node that receives a probe tone receives an RTS/CTS-e frame while continuing to perform re-synchronization processing. Then, after waiting for reception of one super-frame, each node that has received a probe tone transmits a probe response after the elapse of a random time period. Probe response transmission by each node is performed during the next super-frame after transmission of the probe tone.

Next, the probe request node checks the attribute list of nodes for which there was a response, and for those that returned music software exchange, video exchange, and game software exchange attributes, performs differential exchange—that is, exchanges only software possessed by one and not possessed by the others. Therefore, a node that has started exchange first transmits a list of IDs of its own exchangeable software. Then a node for which exchange has been presented transmits a list of IDs of its own exchangeable software in response to the received list, and also issues a transfer request for software possessed by the counterpart node that it does not possess itself and has no experience of exchanging for several months.

A node that has initiated a file exchange request responds to a software transfer based thereupon and also makes its own transfer request to the responding side. In file exchange processing, transfer operations of a file of a mutually predetermined volume—for example, 50 MB—at a time are repeated, and are continued until the counterpart node is no longer a neighboring node or transfer ends. Then, if necessary, the requesting node updates the transfer time by re-exchange of an RTS/CTS-e frame.

FIG. 22 shows a music software file list managed by a mobile file exchange apparatus.

In FIG. 22, each music ID is identified by a TOC (Table of Content) 1901 and a track number 1904. A title 1902 and artist name 1903 are input by a user or input by means of a CDDB (CD number database) via an access point. These are user information items and are not directly related to file exchange operations.

A music file acquired from a CD, the Internet, or the like, is copied to hard disk apparatus 1806 by external media section 1808. At this time, a media flag 1905 is "on", a shadow flag 1906 is "off", and a time limit 1907 is "unlimited". A list transmitted at the time of media exchange with another mobile file exchange apparatus has only software with media flag 1905 "on". Exchanged software also remains in its own file list as a song with media flag 1905 in the "on" state, but a time limit is set. For example, when the shadowing time limit is set as 100 days, an item that has not been played back even once after the elapse of 100 days is made a shadow file. Here, a shadow file means a file whose existence can be recognized by a user, but that cannot be played back. However, since media flag 1905 is "on" and a music file actually exists in hard disk apparatus 1806, it can be treated as one of one's own exchange files.

When the shadowing time limit is exceeded or the possible number of playback times is reached, a file is made a shadow file, and a new time limit is set. Then 100 days is newly set with this as a deletion limit. When this period is exceeded, music file software is deleted from hard disk apparatus 1806. At this time, an entry with media flag 1905 "off" and the shadow flag "on" is left in the file list with a re-entry suppression time limit set. This re-entry suppression time limit restricts the making of an entry again for a file for which there is no music file already but for which test-listening has been carried out once, which enables a state in which the same file can be listened to any number of times to be prevented. When a re-entry suppression time limit is exceeded, the entry itself disappears, and re-entry becomes possible.

it is also possible to select only items more to one's taste among a large number of exchanged files by, for example, specifying a genre, or restricting music file formats to be opened. A file not to one's taste is made a shadow file immediately and deleted if the time limit is reached without its having been viewed by the user.

When the user copies that media to another device from external media section 1808, main CPU 1805 confirms that the media flag is "on" and then moves the millimeter wave UWB access point and searches. Alternatively, the user connects to an IP network from a mobile phone with relay capability by means of millimeter wave UWB, confirms that authentication and charging have been carried out using electronic commerce, and then creates an entry with an unlimited time limit in the file list. Then main CPU 1805 sets shadow flag 1906 to "off" and copies a software file in the hard disk apparatus to an external media. When installing purchased software from an external media to one's own mobile file exchange apparatus, also, charging is not necessary but authentication is. This is because the exchange of software whose circulation is not desired becomes possible.

Also, when relaying to an IP network by means of millimeter wave UWB, it is desirable for IP processing to terminate at an access point or mobile phone. If this is not done, although an IP address is assigned, millimeter wave UWB will cause confusion in mobile communications with a private address implemented by ordinary IPv4. However, since using a network address for each access point results in inefficient address assignment, it is preferable to use IPv6 or to employ a configuration whereby TCP/IP or higher data is exchanged on a millimeter wave UWB link.

In the above implementation example, the description of exchanged files has been limited to music files, but video file and game software file exchange can also be managed in a similar way.

Also, when exchanging a list of software, if information indicating that the file list time limit is unlimited (that is, that the software has been purchased) is also exchanged, peripheral users can create rankings of purchased software. This can be a purchasing aid for users. Comments such as software recommendations may also be included in the ranking list.

Furthermore, if a mobile file exchange apparatus performs file reception of the mobile file exchange apparatus's own control software, it is possible for updating to be carried out automatically. In this case, it is desirable to enable file exchange to be performed on a priority basis by adding a flag indicating priority or the like to the file.

Embodiment 5

Figure 23:
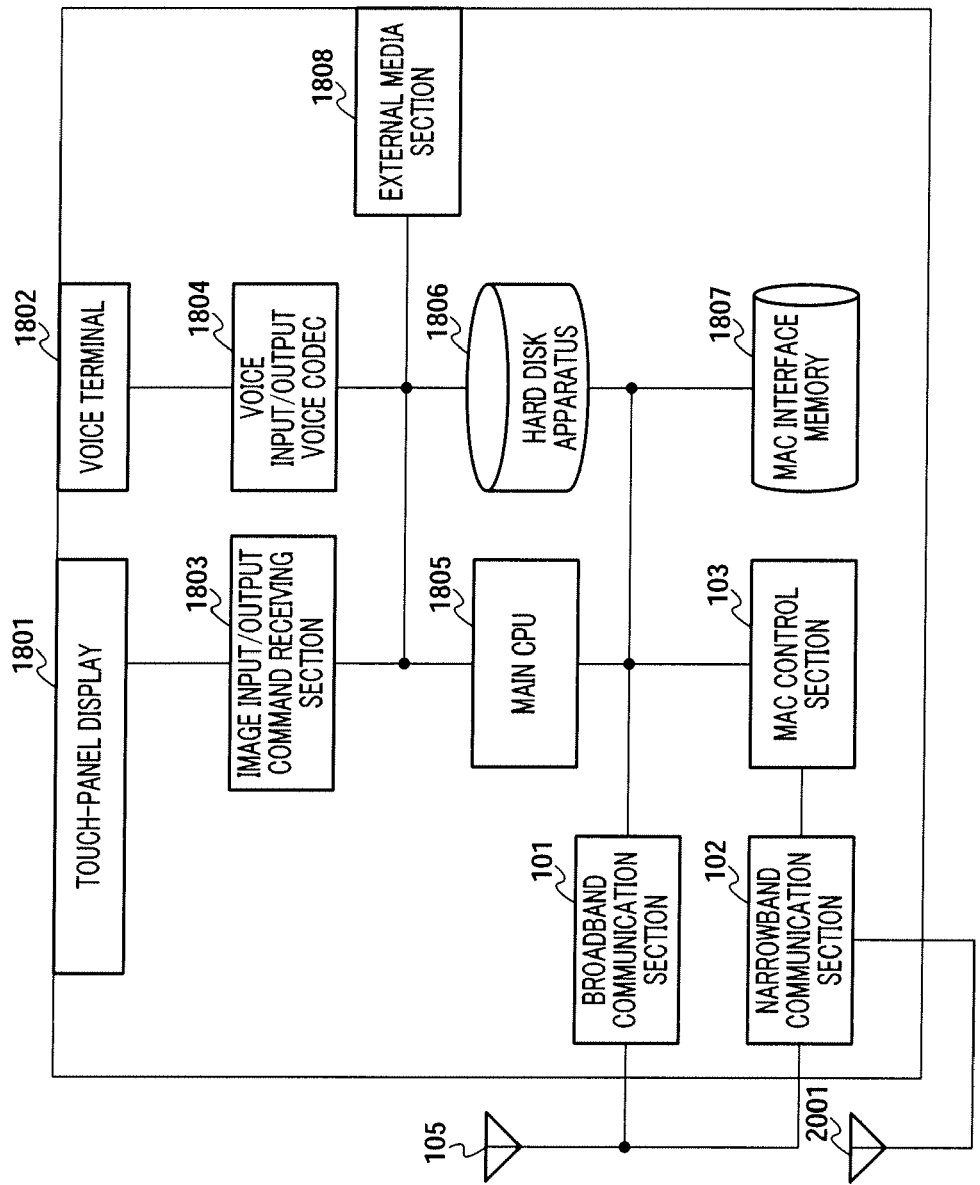
FIG. 23 is a drawing showing the configuration of a mobile file exchange apparatus according to Embodiment 5 of the present invention.

FIG. 23 is a configuration diagram of a mobile file exchange apparatus according to this embodiment. The configuration in this embodiment differs from that of a mobile file exchange apparatus according to Embodiment 4 in also having a unidirectional directional antenna 2001.

This antenna 2001 is used when it is wished to perform file exchange while visually identifying an opposite party with whom the user wants to communicate.

Figure 24:
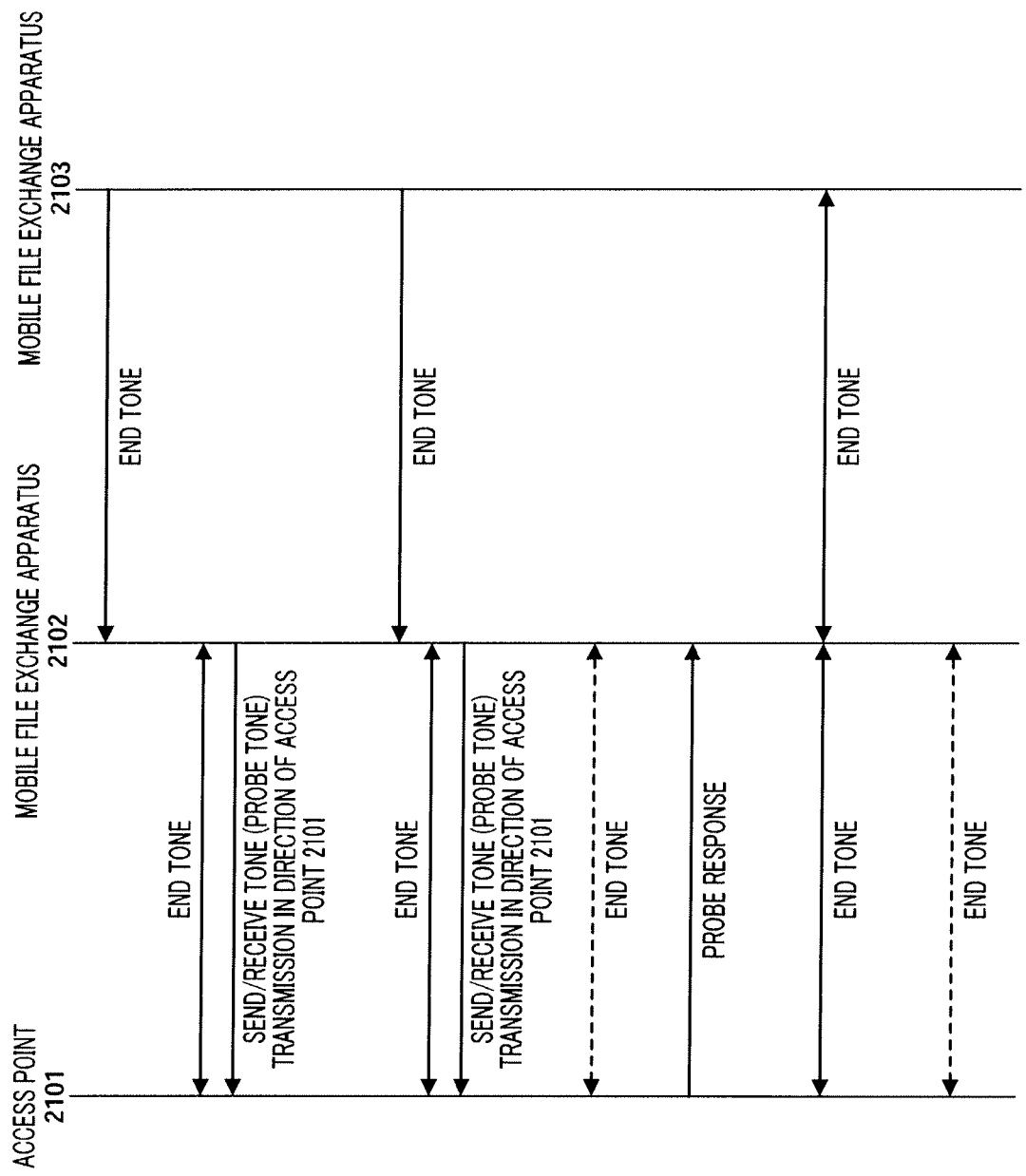
FIG. 24 is a drawing showing a sequence whereby a mobile file exchange apparatus according to Embodiment 5 of the present invention connects to an access point.

FIG. 24 is a sequence diagram for connecting a mobile file exchange apparatus to an access point.

When a probe request command for an access point 2101 is input from the touch panel of a mobile file exchange apparatus 2102, mobile file exchange apparatus 2102 transmits a probe tone at its own end tone timing. If another mobile file exchange apparatus 2103 transmits an end tone at this time, mobile file exchange apparatus 2102 re-synchronizes with this and transmits a probe tone again.

Next, mobile file exchange apparatus 2101 awakened from sleep by the probe tone transmits a probe response.

Then mobile file exchange apparatus 2102 displays access point 2101 attribute information and so forth transmitted in this probe response on touch-panel display 1801. For example, "Access point—music file exchange" may be displayed.

Next, when the user selects that access point, the display on the touch-panel display is subsequently updated by data exchange using Internet hypertext (http) or the like, and, for example, "Connect" or suchlike command input is performed. At this time, music software charging is performed, for example.

As described above, according to a mobile file exchange apparatus of this embodiment, by means of a restriction of physically directing an antenna toward a target node, a requesting node can start communication and erroneous specification of a counterpart node can be prevented.

Also, if a plurality of mobile file exchange apparatuses are present in a specified direction, and there are a plurality of responses, differences in the directions of arrival of each probe response according to probe response direction-of-arrival estimation are displayed on a display as a plan view. By this means, the user can easily decide which mobile file exchange apparatus to select from among many probe responses.

Embodiment 6

Figure 25:
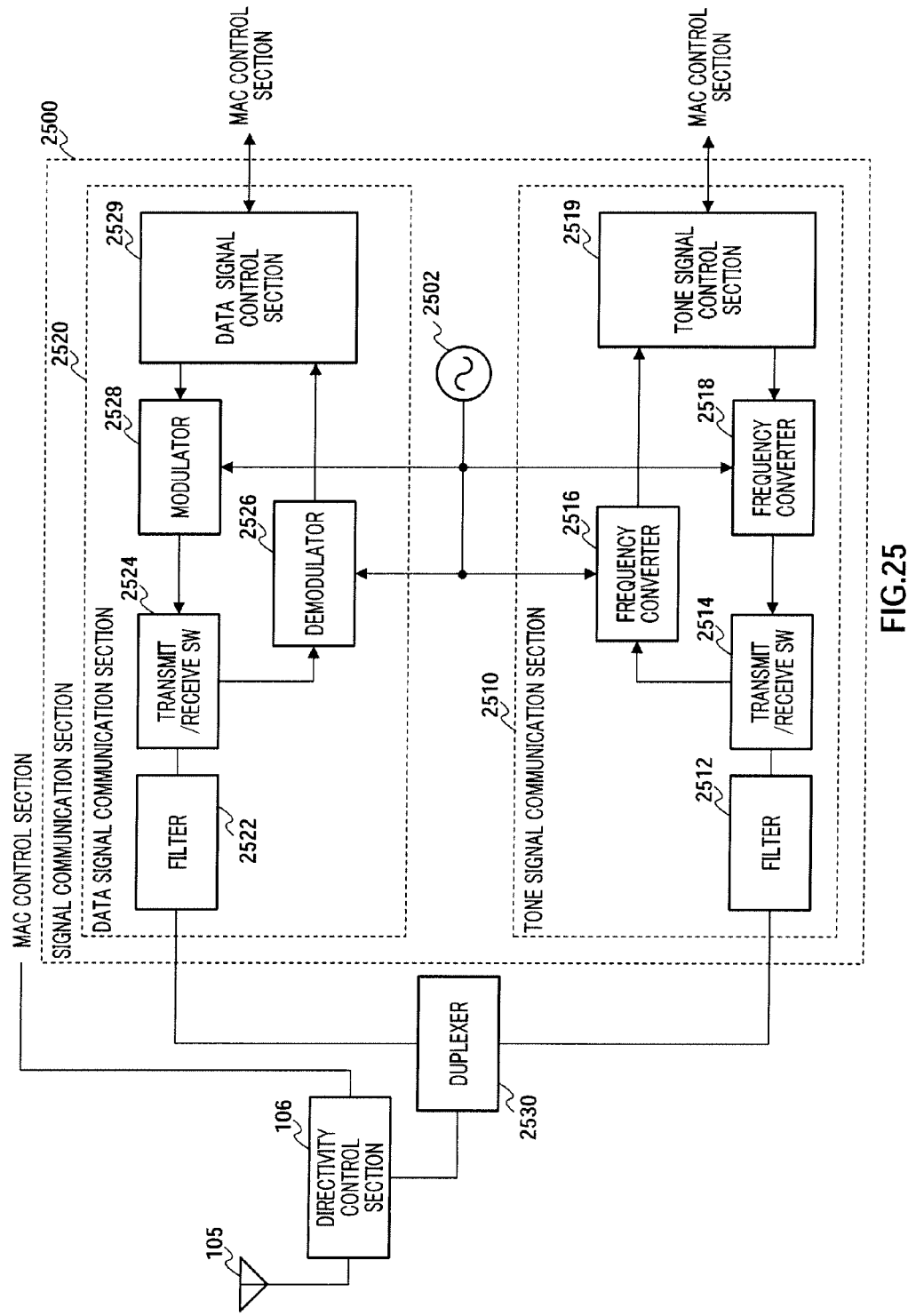
FIG. 25 is a block diagram showing the configuration of a signal communication section according to Embodiment 6 of the present invention.

A configuration according to Embodiment 6 will now be described with reference to FIG. 25. FIG. 25 is a block diagram showing the configuration of a signal communication section 2500 of a radio communication apparatus according to this embodiment.

A radio communication apparatus according to this embodiment differs from that of Embodiment 1 in having a configuration in which the parts comprising broadband communication section 101 and narrowband communication section 102 are not separated into two independent blocks, but instead a signal communication section 2500 is provided that is one integrated block. The configuration and operation of this embodiment corresponding to MAC control section 103 and other parts other than broadband communication section 101 and narrowband communication section 102 in Embodiment 1 are identical to those of Embodiment 1, and therefore a description thereof is omitted here.

Signal communication section 2500 is composed of a tone signal communication section 2510, a data signal communication section 2520, and a carrier signal source 2502. Tone signal communication section 2510 is equipped with a transmit/receive switch 2514, a frequency converter 2516, a frequency converter 2518, and a tone signal control section 2519. Similarly, data signal communication section 2520 is equipped with a filter 2522, a transmit/receive switch 2524, a demodulator 2526, a modulator 2528, and a data signal control section 2529.

When transmitting, tone signal communication section 2510 generates a tone signal of predetermined length from a tone signal control signal input from MAC control section 103, performs frequency conversion on this tone signal, and outputs it to a duplexer 2530. Here, "tone signal control signal" does not mean an actual tone signal of predetermined length as in FIG. 4, but a logical tone signal indicating what tone signal a signal is, so to speak. In Embodiments 1 through 5, there may simply be a tone signal. Tone signal communication section 2510 performs frequency conversion of the tone signal input from duplexer 2530 to convert it to a tone signal control signal, and outputs this to MAC control section 103.

"Tone signal" means a "tone signal control signal" that controls baseband tone signal generation, a "tone signal" for which amplitude, phase, or suchlike modulation is not performed, or a "tone signal superimposed on a carrier" generated by multiplying a tone signal carrier by a carrier frequency.

When transmitting, a filter 2512 band-limits a tone signal input from transmit/receive switch 2514 to a predetermined frequency, and outputs the signal to duplexer 2530. When receiving, filter 2512 band-limits a tone signal input from duplexer 2530 to a predetermined frequency, and outputs the signal to transmit/receive switch 2514.

Transmit/receive switch 2514 performs signal connection and direction switching between transmission and reception so that, when transmitting, a post-frequency-conversion tone signal input from frequency converter 2518 is output to filter 2512, and when receiving, a tone signal input from filter 2512 is output to frequency converter 2516.

Frequency converter 2516 performs frequency conversion of a tone signal input from transmit/receive switch 2514. That is to say, frequency converter 2516 converts a tone signal to a baseband signal based on a carrier output from carrier signal source 2502, and outputs the converted signal to tone signal control section 2519.

When transmitting, frequency converter 2518 performs frequency conversion of a tone signal input from tone signal control section 2519—that is, converts it to a signal with the carrier output from carrier signal source 2502 as the center frequency—and outputs the converted signal to transmit/receive switch 2514.

When transmitting, tone signal control section 2519 generates a tone signal based on a unique data pattern held in tone signal control section 2519 in accordance with a tone signal control signal input from MAC control section 103, and outputs this signal to frequency converter 2518. When receiving, tone signal control section 2519 has a tone signal input from frequency converter 2516 as input, determines the type of tone signal according to the length of the tone signal, generates a corresponding tone signal control signal, and outputs this signal to MAC control section 103.

Similarly, when transmitting, data signal communication section 2520 modulates a data signal input from MAC control section 103 and outputs the modulated signal to duplexer 2530. When receiving, data signal communication section 2520 performs frequency conversion of a data signal input from duplexer 2530, and outputs the resulting signal to MAC control section 103.

When transmitting, filter 2522 band-limits a data signal input from transmit/receive switch 2524 to a predetermined frequency, and outputs the signal to duplexer 2530. When receiving, filter 2522 band-limits a data signal input from duplexer 2530 to a predetermined frequency, and outputs the signal to transmit/receive switch 2524.

Transmit/receive switch 2524 performs signal connection and direction switching between transmission and reception so that, when transmitting, a post-modulation data signal input from modulator 2528 is output to filter 2522, and when receiving, a data signal input from filter 2522 is output to demodulator 2526.

Demodulator 2526 performs demodulation of a data signal input from transmit/receive switch 2524. That is to say, demodulator 2526 converts a data signal to a baseband signal based on a carrier output from carrier signal source 2502, and outputs the converted signal to data signal control section 2529.

When transmitting, modulator 2528 modulates a data signal input from data signal control section 2529—that is, converts it to a signal with the carrier output from carrier signal source 2502 as the center frequency—and outputs the modulated signal to transmit/receive switch 2524.

When transmitting, data signal control section 2529 outputs a data signal input from MAC control section 103 to modulator 2528. When receiving, data signal control section 2529 outputs a data signal input from demodulator 2526 to MAC control section 103.

Carrier signal source 2502 generates a carrier, and outputs the carrier to frequency converter 2516 and demodulator 2526. FIG. 25 shows a configuration in which tone signal communication section 2510 and data signal communication section 2520 share carrier signal source 2502.

A configuration with separate carrier signal sources can also be used, both when signals with different center frequencies are used for a tone signal and a data signal, and when signals with the same center frequency are used. In Embodiment 1, such a configuration is implemented when data signal communication section 2520 and a carrier signal source are used in broadband communication section 101, and tone signal communication section 2510 and a separate carrier signal source are used in narrowband communication section 102. Even if there is a single carrier signal source, different center frequencies can be used for tone signal communication section 2510 and data signal communication section 2520 by changing the frequency from the carrier signal source 2502 frequency using a mixer or suchlike frequency converting element. With regard to the antenna, also, a configuration may be used in which a plurality of antennas are divided between tone signal use and data signal use according to the signal band.

Although it is preferable to use a narrowband signal as a tone signal and to use a broadband signal as a data signal in this embodiment, the present invention is not limited to this, and it is possible to set tone signal and data signal bands without regard to relative band size.

It also goes without saying that the present invention also includes a configuration in which a narrowband communication section and broadband communication section of Embodiments 2 through 5 are replaced by tone signal communication section 2510, data signal communication section 2520, and carrier signal source 2502 of this embodiment.

The operation of signal communication section 2500 of a radio communication apparatus of Embodiment 6 will now be described.

First, the operation of tone signal communication section 2510 will be described. When transmitting, tone signal control section 2519 generates a tone signal based on a unique data pattern held in tone signal control section 2519 in accordance with a tone signal control signal input from MAC control section 103, and outputs this signal to frequency converter 2518.

Then frequency converter 2518 performs frequency conversion of the tone signal input from tone signal control section 2519—that is, converts it to a signal with the carrier output from carrier signal source 2502 as the center frequency—and outputs the frequency-converted signal to transmit/receive switch 2514.

Next, transmit/receive switch 2514 outputs the post-frequency-conversion tone signal input from frequency converter 2518 to filter 2512. Then filter 2512 band-limits the tone signal input from transmit/receive switch 2514 to a predetermined frequency, and outputs the band-limited tone signal to duplexer 2530.

On the other hand, when receiving, filter 2512 band-limits a tone signal input from duplexer 2530 to a predetermined frequency, and outputs the band-limited tone signal to transmit/receive switch 2514.

Transmit/receive switch 2514 outputs the tone signal input from filter 2512 to frequency converter 2516. Frequency converter 2516 performs frequency conversion of the tone signal input from transmit/receive switch 2514. That is to say, frequency converter 2516 converts the tone signal to a baseband signal based on a carrier output from carrier signal source 2502, and outputs the converted signal to tone signal control section 2519.

Tone signal control section 2519 has the tone signal input from frequency converter 2516 as input, determines the type of tone signal according to the length of the tone signal, generates a corresponding tone signal control signal, and outputs the generated tone signal control signal to MAC control section 103.

Next, the operation of data signal communication section 2520 will be described.

When data signal communication section 2520 is transmitting, data signal control section 2529 outputs a data signal input from MAC control section 103 to modulator 2528.

Modulator 2528 modulates a data signal input from data signal control section 2529—that is, converts it to a signal with the carrier output from carrier signal source 2502 as the center frequency—and outputs the modulated data signal to transmit/receive switch 2524.

Next, transmit/receive switch 2524 outputs the post-modulation data signal input from modulator 2528 to filter 2522. Then filter 2522 band-limits the data signal input from transmit/receive switch 2524 to a predetermined frequency, and outputs the band-limited data signal to duplexer 2530.

On the other hand, when receiving, filter 2522 band-limits a data signal input from duplexer 2530 to a predetermined frequency, and outputs the band-limited data signal to transmit/receive switch 2524.

Transmit/receive switch 2524 outputs the data signal input from filter 2522 to demodulator 2526. Demodulator 2526 performs demodulation of the data signal input from transmit/receive switch 2524. That is to say, demodulator 2526 converts the data signal to a baseband signal based on a carrier output from carrier signal source 2502, and outputs the converted signal to data signal control section 2529.

Data signal control section 2529 outputs the data signal input from demodulator 2526 to MAC control section 103.

Thus, in this embodiment, a configuration is employed in which tone signal communication section 2510 and data signal communication section 2520 share carrier signal source 2502, enabling a low-cost radio communication apparatus with a small number of parts to be provided.

Embodiment 7

The configuration and operation of a radio communication apparatus according to Embodiment 7 will now be described.

FIG. 25 of Embodiment 6 shows an example in which tone signal communication section 2510 and data signal communication section 2520 are provided as two transmission systems in order to transmit a broadband signal and a tone signal simultaneously. However, if simultaneous transmission is not performed, a single transmission system is sufficient, and therefore a radio communication apparatus with such a configuration is presented here as Embodiment 7, and its configuration and operation are described below.

Figure 26:
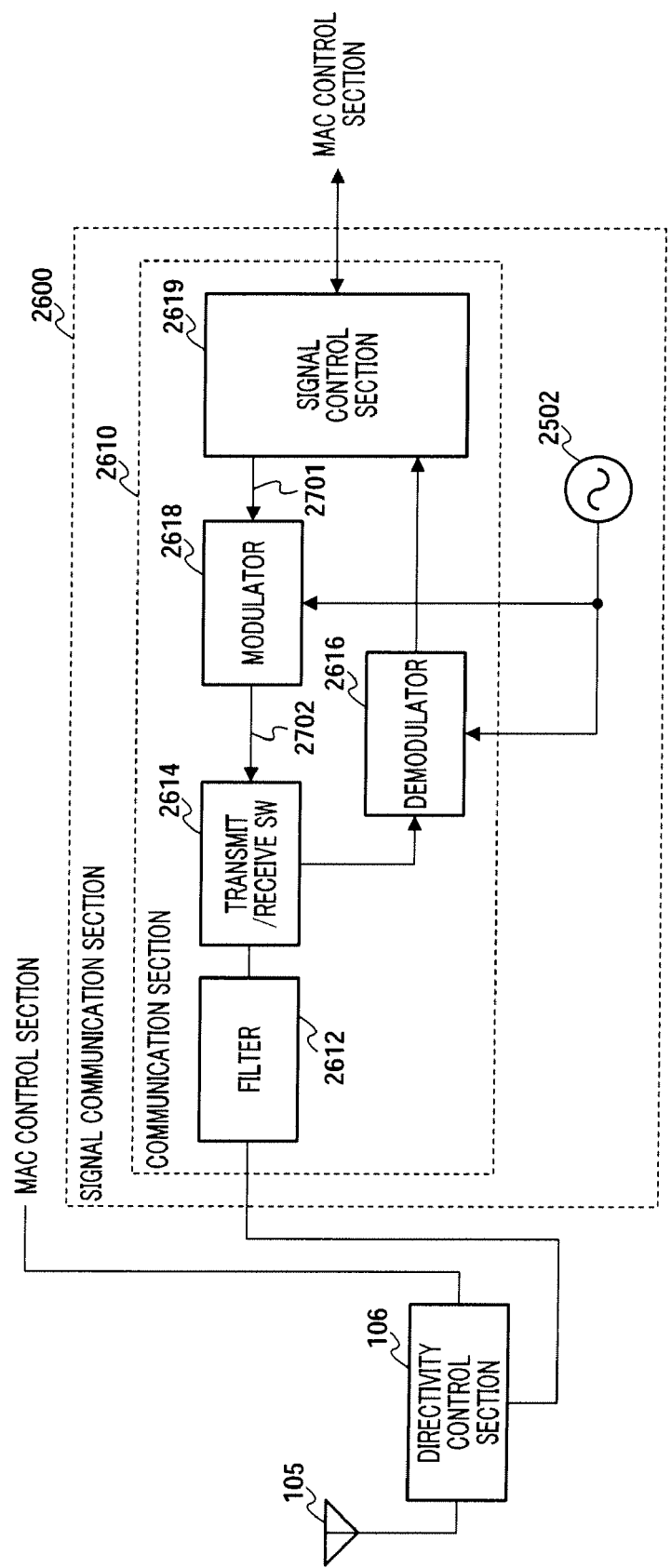
FIG. 26 is a block diagram showing the configuration of a signal communication section according to Embodiment 7 of the present invention.

The configuration of Embodiment 7 will now be described with reference to FIG. 26. FIG. 26 is a block diagram showing the configuration of a signal communication section 2600 of a radio communication apparatus according to this embodiment.

The configuration and operation of this embodiment corresponding to MAC control section 103 and other parts other than broadband communication section 101 and narrowband communication section 102 in Embodiment 1 are identical to those of Embodiment 1, and therefore a description thereof is omitted here.

Signal communication section 2600 is composed of a communication section 2610 and a carrier signal source 2502. Communication section 2610 is equipped with a filter 2612, a transmit/receive switch 2614, a demodulator 2616, a modulator 2618, and a signal control section 2619.

When transmitting a tone signal, communication section 2610 generates a tone signal from a tone signal control signal input from MAC control section 103, and outputs this tone signal to modulator 2618. When receiving a tone signal, communication section 2610 has a tone signal input from demodulator 2616 as input, determines the type of tone signal according to the length of the tone signal, generates a corresponding tone signal control signal, and outputs this signal to MAC control section 103.

When transmitting a data signal, communication section 2610 modulates a data signal input from MAC control section 103 and outputs the modulated signal to directivity control section 106. When receiving a data signal, communication section 2610 demodulates a data signal input from directivity control section 106, and outputs the demodulated signal to MAC control section 103.

When transmitting, filter 2612 band-limits a tone signal or data signal input from transmit/receive switch 2614 to a predetermined frequency, and outputs the signal to directivity control section 106. When receiving, filter 2612 band-limits a tone signal or data signal input from directivity control section 106 to a predetermined frequency, and outputs the signal to transmit/receive switch 2614.

Transmit/receive switch 2614 performs signal connection and direction switching between transmission and reception so that, when transmitting, a post-frequency-conversion or post-modulation tone signal or data signal input from modulator 2618 is output to filter 2612, and when receiving, a tone signal or data signal input from filter 2612 is output to demodulator 2616.

Demodulator 2616 performs frequency conversion or demodulation of a tone signal or data signal input from transmit/receive switch 2614. That is to say, demodulator 2616 converts a tone signal or data signal to a baseband signal based on a carrier output from carrier signal source 2502, and outputs the converted signal to signal control section 2619.

When transmitting, modulator 2618 performs frequency conversion or modulation of a tone signal or data signal input from signal control section 2619—that is, converts it to a signal with the carrier output from carrier signal source 2502 as the center frequency—and outputs the resulting signal to transmit/receive switch 2614.

When transmitting a tone signal, signal control section 2619 outputs a tone signal to modulator 2618 based on a unique data pattern held in signal control section 2619 in accordance with a tone signal control signal input from MAC control section 103. When transmitting data, signal control section 2619 outputs a data signal input from MAC control section 103 to modulator 2618.

When receiving a tone signal, signal control section 2619 has a tone signal input from demodulator 2616 as input, determines the type of tone signal according to the length of the tone signal, generates a corresponding tone signal control signal, and outputs this signal to MAC control section 103. When receiving a data signal, signal control section 2619 has a data signal input from demodulator 2616 as input, and outputs this signal to MAC control section 103.

The operation of a radio communication apparatus according to Embodiment 7 will now be described.

When transmitting a tone signal, signal control section 2619 outputs a tone signal to modulator 2618 based on a unique data pattern held in signal control section 2619 in accordance with a tone signal control signal input from MAC control section 103. When transmitting a data signal, signal control section 2619 outputs a data signal input from MAC control section 103 to modulator 2618.

Then modulator 2618 performs frequency conversion or modulation of a tone signal or data signal input from signal control section 2619—that is, converts it to a signal with the carrier output from carrier signal source 2502 as the center frequency—and outputs a modulator output signal 2702 to transmit/receive switch 2614.

Next, transmit/receive switch 2614 outputs a post-frequency-conversion or post-modulation tone signal or data signal (modulator output signal 2702) input from modulator 2618 to filter 2612. Filter 2612 band-limits the tone signal or data signal input from transmit/receive switch 2614 to a predetermined frequency, and outputs the band-limited signal to directivity control section 106.

On the other hand, when receiving, filter 2612 band-limits a tone signal or data signal input from directivity control section 106 to a predetermined frequency, and outputs the band-limited signal to transmit/receive switch 2614.

Transmit/receive switch 2614 outputs the tone signal or data signal input from filter 2612 to demodulator 2616. Demodulator 2616 performs frequency conversion or demodulation of the tone signal or data signal input from transmit/receive switch 2614. That is to say, demodulator 2616 converts the tone signal or data signal to a baseband signal based on a carrier output from carrier signal source 2502, and outputs the converted signal to signal control section 2619.

When receiving a tone signal, signal control section 2619 has a tone signal input from demodulator 2616 as input, determines the type of tone signal according to the length of the tone signal, generates a corresponding tone signal control signal, and outputs this signal to MAC control section 103. When receiving a data signal, signal control section 2619 outputs a data signal input from demodulator 2616 to MAC control section 103.

Figure 27:
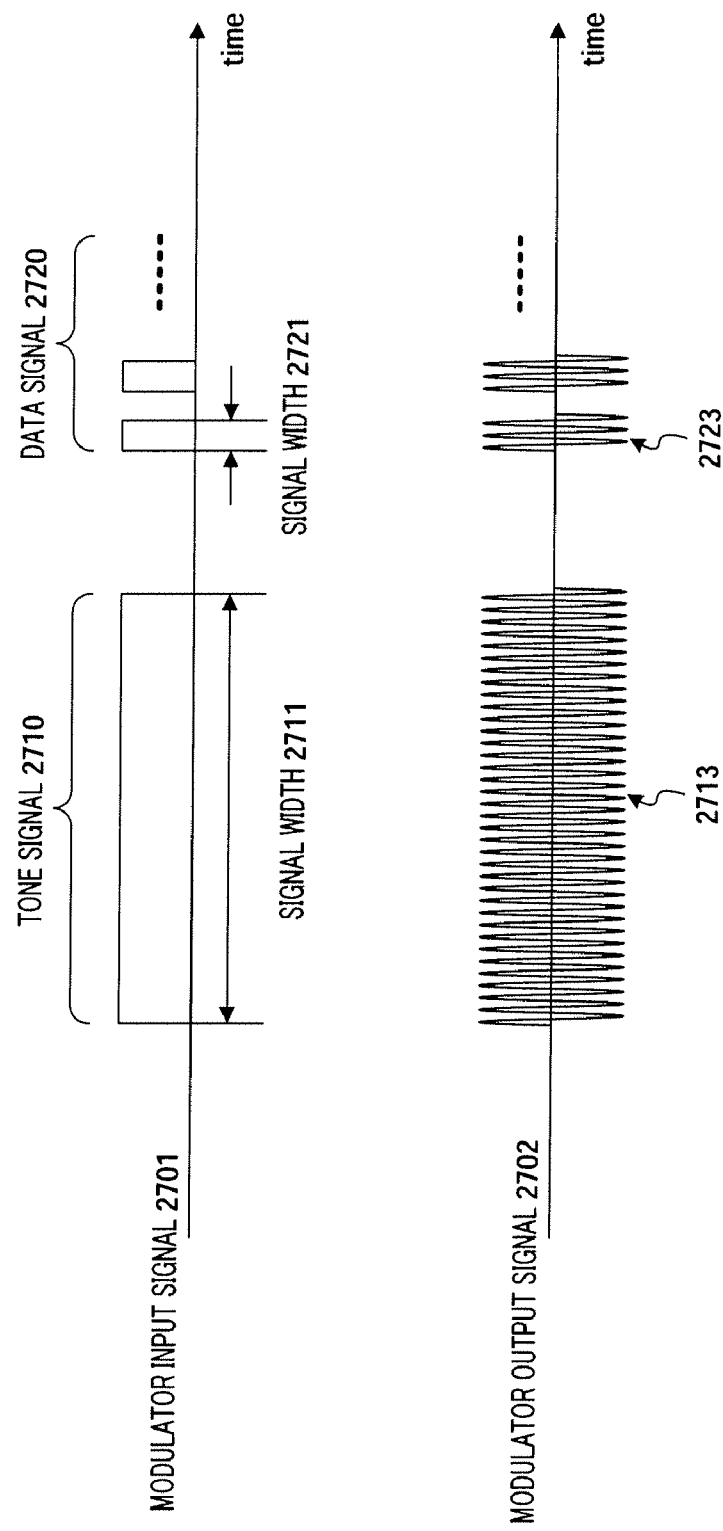
FIG. 27 is a timing chart showing signal waveforms of a signal communication section according to Embodiment 7 of the present invention.

FIG. 27 shows an example of the signal waveform of modulator output signal 2702 after an input modulator input signal 2701 has undergone modulation or frequency conversion by modulator 2618 in this case. In the signals input to modulator 2618, signal width 2711 of a tone signal 2710 and signal width 2721 of a data signal 2720 differ, and a modulator output signal containing a sine wave component also differs in width according to this signal width. It goes without saying that a signal with a wide width is a narrowband signal, and a signal with a narrow width is a broadband signal. Examples of signal widths are 1 μsec for tone signal 2710 and 1 nsec for data signal 2720, but the signal widths are not limited to these, and will vary greatly depending on the application system. Also, a tone signal need not necessarily be a narrowband signal, and tone signal width 2711 may be equal to or smaller than data signal width 2721.

Also, with regard to the method of separating a tone signal and data signal when receiving, if a tone signal and data signal are of different frequencies, for example, it is possible to separate the two by filter band. Similarly, if tone signal and data signal are not transmitted simultaneously, it is possible to separate them temporally. Furthermore, if they are transmitted at the same frequency and the same time, it is possible to separate them by changing the transmit signal power. In this case, separation can be performed by means of received power threshold value in a demodulator 2616 by, for example, making the amplitude smaller and making the transmission power smaller for a tone signal having a long signal time, and making the amplitude larger and making the transmission power larger for a data signal.

Thus, in this embodiment, a configuration is employed in which a tone signal and a data signal are processed by a single signal communication section, as a result of which the configuration is simple and the number of parts small, and a low-cost, low-power-consumption radio communication apparatus can be provided.

A radio communication method of the present invention is a radio communication method whereby a plurality of radio communication apparatuses communicate with each other in an ad hoc network, and has a step of transmitting an end tone for identifying the end of a super-frame from one radio communication apparatus, and a step of synchronizing at another radio communication apparatus, the end of its own super-frame when having received that end tone.

By this means, a radio communication apparatus performs synchronization with a super-frame by using a low-power-consumption tone signal, without using a beacon provided by a modulated signal, enabling power consumption to be reduced as compared with a conventional method.

Also, a radio communication method of the present invention further has a step of transmitting a send/receive tone for giving notification of data transmission from the one radio communication apparatus while performing carrier sensing after the elapse of a predetermined time from the end of a super-frame, and a step of transmitting a data signal after completion of transmission of that send/receive tone.

By this means, a radio communication apparatus can detect the start of data reception by monitoring only a tone signal, making it possible to keep standby power consumption low.

Also, a radio communication method of the present invention further has a step of enabling reception of the data signal and receiving a data signal at the one radio communication apparatus after receiving a send/receive tone from another radio communication apparatus, and a step of transmitting the send/receive tone from the one radio communication apparatus while performing carrier sensing when having received that data signal normally.

By this means, a radio communication apparatus need not wait for reception of a UWB or suchlike data signal, enabling standby power consumption to be reduced.

Also, in a radio communication method of the present invention, the step of transmitting an end tone is a step of transmitting a narrowband signal end tone for identifying the end of a super-frame from the one radio communication apparatus.

By this means, a radio communication apparatus performs synchronization with a super-frame by using a low-power-consumption, narrowband tone signal, without using a beacon provided by a modulated signal, enabling power consumption to be reduced as compared with a conventional method.

Also, a radio communication method of the present invention further has a step of transmitting a narrowband signal send/receive tone from the one radio communication apparatus while performing carrier sensing after the elapse of a predetermined time from the end of a super-frame, and a step of transmitting a broadband data signal from the one radio communication apparatus after completion of transmission of the send/receive tone.

By this means, a radio communication apparatus can detect the start of data reception by monitoring only a narrowband signal, making it possible to keep standby power consumption low.

Also, a radio communication method of the present invention further has a step of enabling reception of a broadband signal and receiving the data signal at the one radio communication apparatus after receiving a send/receive tone from another radio communication apparatus, and a step of transmitting the narrowband send/receive tone from the one radio communication apparatus while performing carrier sensing when having received the data signal normally.

By this means, a radio communication apparatus need not wait for reception of wideband signal such as a UWB, enabling standby power consumption to be reduced.

In a radio communication method of the present invention, an end tone is transmitted in an end tone slot set before and after the end of a super-frame, and the one radio communication apparatus re-sets the end of a super-frame based on the end tone received first in an end tone slot.

By this means, it is possible for each radio communication apparatus of a super-frame group to synchronize with the earliest end tone in a super-frame.

Also, a radio communication method of the present invention has a step of, when an end tone received from another radio communication apparatus is the first in an end tone slot, and reception is completed before the start of transmission of its own end tone, re-setting the end of a super-frame at that time of completion, at the one radio communication apparatus, and a step of transmitting from the one radio communication apparatus, its own end tone at the timing at which an end tone is received.

By this means, the time difference between an end tone received first and the apparatus's own end tone can be kept smaller, making it possible to synchronize with the same super-frame in a short time overall.

Also, a radio communication method of the present invention has a step of, when there is a mixed plurality of super-frame groups that are groups of radio communication apparatuses sharing a super-frame, a radio communication apparatus of a first super-frame group notifying another radio communication apparatus of its own super-frame group of synchronizing with a second super-frame, and that radio communication apparatus of the first super-frame group waits for reception of an end tone from a second super-frame group across super-frames as a whole, and re-sets the end of the super-frame based on that received end tone.

By this means, it is possible for a radio communication apparatus to start transmission/reception even if it encounters another super-frame group in a mobile environment.

Also, in a radio communication method of the present invention, a radio communication apparatus belonging to a first super-frame group notifies another radio communication apparatus of synchronizing with a super-frame of a second super-frame group by transmitting an end tone again in an end tone slot after transmitting an end tone giving notification of the current end, and another radio communication apparatus belonging to the first super-frame group that receives that end tone giving notification of that synchronizing transmits an end tone again in an end tone slot after transmitting an end tone giving notification of the current end.

By this means, a radio communication apparatus executes re-synchronization in super-frame group units, and all communications are possible since group convergence occurs without any fear of current communication being disrupted.

Also, a radio communication method of the present invention provides at a narrowband tone signal, a beginning tone 1 and beginning tone 2 defined by changing duration, and has a step of transmitting a narrowband signal beginning tone 1 for communication collision avoidance from a radio communication apparatus while performing carrier sensing, a step of transmitting a narrowband signal beginning tone 2 from a radio communication apparatus that receives that beginning tone 1, and a step of stopping at a radio communication apparatus that receives that beginning tone 1 or beginning tone 2, transmitting a narrowband signal beginning tone 1 from itself in the current super-frame.

By this means, when a plurality of responses are made in multicast communication or the like, each radio communication apparatus suppresses transmission so that responses are made one at a time.

Also, a radio communication method of the present invention has a step of transmitting from a radio communication apparatus that transmits beginning tone 1, a probe request inquiring about attributes and/or communication environment by means of a broadband signal to a radio communication apparatus that transmits beginning tone 2, and a step of transmitting from a radio communication apparatus that receives that probe request, a probe response containing information on its own attributes and communication environment by means of a broadband signal.

By this means, a plurality of geographical reuses are possible for a radio communication apparatus in the same time period by causing probe requests to be performed by means of multicasting using a beginning tone.

A radio communication method of the present invention has a step of transmitting a send/receive tone, from a radio communication apparatus that receives a probe request, before transmitting a probe response, a step of transferring a received send/receive tone from a radio communication apparatus that transmits a probe request when having received that send/receive tone, and a step of stopping at a radio communication apparatus that is not transmitting a probe request, the start of transmission of a probe response from itself when having received a send/receive tone.

By this means, contention between a request-side radio communication apparatus and a response-side radio communication apparatus located next to the neighboring radio communication apparatus of the request-side radio communication apparatus can be kept to a minimum.

Also, a radio communication method of the present invention has a step of counting by means of back-off a predetermined time until probe response reception is completed, at a radio communication apparatus that transmits a probe request, and a step of transmitting a probe request period end notification to a neighboring radio communication apparatus from a radio communication apparatus that transmits a probe request when having finished counting the predetermined time.

By this means, a radio communication apparatus can terminate a probe in the minimum necessary time.

Also, in a radio communication method of the present invention, in a probe request a radio communication apparatus that transmits a probe request configures a plurality of sectors by means of a plurality of directional antennas, and when radio communication apparatuses in each sector are in a state in which mutual transmission/reception is possible, send/receive tone transmission performed by a radio communication apparatus that transmits a probe request is performed in order on a sector-by-sector basis by each directional antenna.

By this means, it is possible for probe processing of a fixed radio communication apparatus to execute a probe operation efficiently by deciding on a sector.

Also, a radio communication method of the present invention has a step of counting by means of back-off a predetermined time until probe response reception is completed, at a radio communication apparatus that transmits a probe request, and a step of transmitting a probe request period end notification to a neighboring radio communication apparatus from a radio communication apparatus that transmits a probe request when having finished a count of the predetermined time in all sectors.

By this means, a radio communication apparatus can make the sector wait time the minimum necessary.

Also, in a radio communication method of the present invention, when having received a send/receive tone following an end tone in an end tone slot, the one radio communication apparatus acquires a control frame containing data transmission/reception reservation information transmitted by a neighboring radio communication apparatus in the super-frame after the end of that end tone slot, and transmits a probe response containing its own attribute and communication environment information and/or information on a time period reserved by a control frame in a time period not reserved by a control frame of the next super-frame.

By this means, a radio communication apparatus can perform time reservation of all sections of a data period by performing communication using RTS/CTS-e, enabling the entirety of a super-frame to be utilized more effectively than with a conventional method.

Also, the durations of narrowband signals (tone signals) used in a radio communication method of the present invention increase in send/receive tone, beginning tone 1, beginning tone 2, and end tone order, and an end tone is at least twice as long as beginning tone 2.

By this means, while a send/receive tone of a radio communication apparatus must be as short as possible due to its relation to throughput, an end tone can still be detected as an end tone even if tripled. Also, if two or more beginning tones 2 are emitted in the same period, they will be regarded as beginning tones 2.

Also, a radio communication method of the present invention is a radio communication method of one radio communication apparatus whereby a plurality of radio communication apparatuses communicate with each other in an ad hoc network, and has a step of measuring elapsed time in a super-frame and transmitting an end tone for identifying the end, a step of transmitting a send/receive tone for giving notification of data transmission after the elapse of a predetermined time based on an end time re-set based on the end tone transmitted first, and a step of transmitting a data signal after completion of transmission of that send/receive tone.

Also, in a radio communication method of the present invention, the end tone and send/receive tone are narrowband signals, and the data signal is a broadband signal data signal.

Also, a radio communication method of the present invention has a step of transmitting a narrowband signal beginning tone 1 for communication collision avoidance from the one radio communication apparatus while performing carrier sensing, and a step of receiving a beginning tone 2 transmitted by another radio communication apparatus that receives the beginning tone 1, at the one radio communication apparatus.

Also, a radio communication method of the present invention has a step of transmitting from one radio communication apparatus that transmits the beginning tone 1, a probe request inquiring about attributes and/or communication environment by means of a broadband signal to the other radio communication apparatus that transmits beginning tone 2, and a step of receiving a probe response containing information on its own attributes and/or communication environment by means of a broadband signal from the other radio communication apparatus that receives the probe request.

Also, a radio communication apparatus of the present invention has a tone signal communication section that transmits and receives tone signals, a data signal communication section that performs modulation and transmits and receives data by means of a broadband signal, a time management section, and a frame transmitting/receiving section. This time management section measures elapsed time in a super-frame, transmits an end tone for identifying the end from the tone signal communication section, or receives an end tone via the tone signal communication section, and re-sets the end time based on the end tone received first before its own end time. The frame transmitting/receiving section transmits a send/receive tone for giving notification of data transmission from the tone signal communication section after the elapse of a predetermined time based on the end time re-set by the time management section, and after transmission of that send/receive tone is completed, transmits data via the data signal communication section, or sets the data signal communication section to a reception-enabled state when a send/receive tone is received, and receives data from the data signal communication section.

By means of this configuration, a radio communication apparatus can implement super-frame synchronization between super-frame groups without using a beacon.

Also, in a radio communication apparatus of the present invention, the tone signal communication section is a narrowband communication section that transmits and receives narrowband tone signals, and the data signal communication section is a broadband communication section that performs modulation and transmits and receives data by means of a broadband signal.

By means of this configuration, a radio communication apparatus can implement super-frame synchronization between super-frame groups without using a beacon.

A radio communication apparatus of the present invention also has a re-synchronization control section. This re-synchronization control section gives notification of synchronizing with a super-frame of another group that does not share a super-frame to another radio communication apparatus belonging to the same group as itself that shares a super-frame. Then an end tone of another group is monitored in all super-frame periods, and when that end tone is received, the super-frame end is re-set to, and an end tone is transmitted via the narrowband communication section.

By this means, it is possible for a radio communication apparatus to perform synchronization with a super-frame of another super-frame group.

A radio communication apparatus of the present invention also has a probe transmitting section that gives a directive for beginning tone 1 transmission to a beginning tone control section, and upon subsequent notification of reception of beginning tone 2 from that beginning tone control section, gives a directive to the frame transmitting/receiving section for transmission of a probe request frame requesting notification of attribute and communication environment information to another radio communication apparatus, and a probe receiving section that, when having received the probe request, directs the frame transmitting/receiving section to transmit its own attribute and/or communication environment information.

By means of this configuration, a radio communication apparatus can implement by means of a probe confirmation of the existence of a node that has been implemented by a beacon.

The present application is based on Japanese Patent Application No. 2005-352992 filed on Dec. 7, 2005, the entire content of which is expressly incorporated herein by reference.

INDUSTRIAL APPLICABILITY

The present invention is useful for a radio communication method and radio communication apparatus in an ad hoc network, and is particularly suitable for file exchange between radio communication apparatuses in a mobility environment.

The invention claimed is:

1. A radio communication method whereby a plurality of radio communication apparatuses communicate with each other in an ad hoc network, comprising:
    transmitting from one radio communication apparatus to another radio communication apparatus an end tone for identifying an end of a current super-frame of the one radio communication apparatus;
    synchronizing at said another radio communication apparatus, an end of its own current super-frame, based on said end tone received from the one radio communication apparatus, to maintain super-frame synchronization at the another radio communication apparatus with the one radio communication apparatus for a next super-frame subsequent to the current super-frame;
    transmitting a send/receive tone for giving notification of data transmission from said one radio communication apparatus while performing carrier sensing after an elapse of a predetermined time from an end of a super-frame; and
    transmitting a data signal after completion of transmission of said send/receive tone from said one radio communication apparatus.

2. The radio communication method according to claim 1, further comprising:
    enabling reception of said data signal and receiving said data signal at said one radio communication apparatus after receiving a send/receive tone from another radio communication apparatus; and transmitting said send/receive tone from said one radio communication apparatus while performing carrier sensing when having received said data signal normally.

3. The radio communication method according to claim 1, wherein an end tone transmitted by said one radio communication apparatus is a narrowband signal.

4. The radio communication method according to claim 3, wherein:

said end tone is transmitted in an end tone slot set before and after an end of a super-frame; and said one radio communication apparatus re-sets an end of a super-frame based on an end tone received first in an end tone slot.

5. The radio communication method according to claim 4, wherein said one radio communication apparatus, when having received a send/receive tone following an end tone in an end tone slot, acquires a control frame containing data transmission/reception reservation information transmitted by a neighboring radio communication apparatus in a super-frame after an end of that end tone slot, and transmits a probe response containing its own attribute and communication environment information and/or information on a time period reserved by said control frame in a time period not reserved by said control frame of a next super-frame.

6. The radio communication method according to claim 4, further comprising:

when an end tone received from another radio communication apparatus is the first in an end tone slot and reception is completed before a start of transmission of its own end tone, re-setting an end of a super-frame on completion of reception of said end tone of said other radio communication apparatus, at said one radio communication apparatus; and transmitting from said one radio communication apparatus, its own end tone at timing at which an end tone is received.

7. The radio communication method according to claim 4 that, when there is a mixed plurality of super-frame groups that are groups of radio communication apparatuses sharing said super-frame, further comprises:

notifying at one radio communication apparatus belonging to a first super-frame group, another radio communication apparatus belonging to said first super-frame group of synchronizing with a second super-frame; and waiting for reception of an end tone from a radio communication apparatus belonging to said second super-frame group across super-frames as a whole, and re-setting an end of a super-frame based on a received end tone, at said one radio communication apparatus of said first super-frame group.

8. The radio communication method according to claim 7, further comprising:

notifying at said one radio communication apparatus belonging to said first super-frame group, another radio communication apparatus belonging to said first super-frame group of synchronizing with a super-frame of said second super-frame group by transmitting an end tone again in an end tone slot after transmitting an end tone giving notification of a current end; and transmitting an end tone again in an end tone slot from another radio communication apparatus belonging to said first super-frame group that receives said end tone giving notification of synchronizing after transmitting an end tone giving notification of a current end.

9. The radio communication method according to claim 1, wherein a data signal transmitted by said one radio communication apparatus is a broadband data signal.

10. The radio communication method according to claim 9, further comprising:

enabling reception of a broadband signal and receiving said data signal at said one radio communication apparatus after receiving a send/receive tone from another radio communication apparatus; and transmitting said narrowband send/receive tone from said one radio communication apparatus while performing carrier sensing when having received said data signal normally.

11. The radio communication method according to claim 9, further comprising:

transmitting a narrowband signal beginning tone 1 for communication collision avoidance from said one radio communication apparatus while performing carrier sensing;

transmitting a narrowband signal beginning tone 2 from a radio communication apparatus that receives said beginning tone 1; and stopping at a radio communication apparatus that receives said beginning tone 1 or said beginning tone 2, transmitting a narrowband signal beginning tone 1 from itself in a current super-frame.

12. The radio communication method according to claim 11, further comprising:

transmitting from a radio communication apparatus that transmits said beginning tone 1, a probe request inquiring about an attribute and/or communication environment by means of a broadband signal to a radio communication apparatus that transmits said beginning tone 2; and transmitting from a radio communication apparatus that receives said probe request, a probe response containing information on its own attribute and/or communication environment by means of a broadband signal.

13. The radio communication method according to claim 12, further comprising:

transmitting a send/receive tone from a radio communication apparatus that receives said probe request before transmitting said probe response;

transferring a received send/receive tone from a radio communication apparatus that transmits said probe request when having received said send/receive tone; and stopping at a radio communication apparatus that is not transmitting said probe request, a start of transmission of said probe response from itself when having received said send/receive tone.

14. The radio communication method according to claim 13, further comprising:

counting by means of back-off a predetermined time until reception of said probe response is completed, at a radio communication apparatus that transmits said probe request; and transmitting a probe request period end notification to a neighboring radio communication apparatus from a radio communication apparatus that transmits said probe request when having finished counting said predetermined time.

15. The radio communication method according to claim 13, wherein, in said probe request, a radio communication apparatus that transmits said probe request configures a plurality of sectors by means of a plurality of directional antennas, and when radio communication apparatuses in each sector are in a state in which mutual transmission/reception is possible, transmission of said send/receive tone performed by a radio communication apparatus that transmits said probe request is performed in order on a sector-by-sector basis by each directional antenna.

16. The radio communication method according to claim 15, further comprising:
   counting by means of back-off a predetermined time until reception of said probe response is completed, at a radio communication apparatus that transmits said probe request; and
   transmitting a probe request period end notification to a neighboring radio communication apparatus from a radio communication apparatus that transmits said probe request when having finished a count of said predetermined time in all sectors.

17. The radio communication method according to claim 11, wherein durations of said narrowband signals that are tone signals increase in send/receive tone, beginning tone 1, beginning tone 2, and end tone order, and beginning tone 2 is at least twice as long as beginning tone 1.

18. A radio communication method of one radio communication apparatus of a plurality of radio communication apparatuses which communicate with each other in an ad hoc network, comprising:
   measuring elapsed time in a first super-frame of the one radio communication apparatus and transmitting an end tone for identifying an end of said first super-frame of the one radio communication apparatus;
   transmitting a send/receive tone for giving notification of data transmission after an elapse of a predetermined time based on an end time re-set for a second super-frame based on an end tone transmitted first among end tones transmitted by said plurality of radio communication apparatuses; and
   transmitting a data signal in said second super-frame after completion of transmission of the send/receive tone.

19. The radio communication method according to claim 18, wherein:
   said end tone and send/receive tone are narrowband signals; and said data signal is a broadband signal.

20. The radio communication method according to claim 19, further comprising:
   transmitting a narrowband signal beginning tone 1 for communication collision avoidance from said one radio communication apparatus while performing carrier sensing; and
   receiving a beginning tone 2 transmitted by another radio communication apparatus that receives said beginning tone 1 at said one radio communication apparatus.

21. The radio communication method according to claim 20, further comprising:
   transmitting a probe request inquiring about an attribute and/or communication environment by means of a broadband signal from one radio communication apparatus that transmits said beginning tone 1 to said other radio communication apparatus that transmits said beginning tone 2; and
   receiving a probe response containing information on its own attribute and/or communication environment by means of a broadband signal from said other radio communication apparatus that receives said probe request.

22. A radio communication apparatus comprising:
   a tone signal communication section that transmits and receives a tone signal;
   a data signal communication section that transmits and receives data;
   a time management section that (i) includes a processor that measures elapsed time in a super-frame, (ii) transmits an end tone for identifying an end via said tone signal communication section, or receives said end tone via said tone signal communication section, and (iii) re-sets an end time based on an end tone received first before its own end time; and
   a frame transmitting/receiving section that transmits a send/receive tone for giving notification of data transmission from said tone signal communication section after an elapse of a predetermined time based on an end time re-set by said time management section, and after transmission of that send/receive tone is completed, transmits data via said data signal communication section, or sets said data signal communication section to a reception-enabled state when having received said send/receive tone, and receives data via said data signal communication section.

23. The radio communication apparatus according to claim 22, wherein:
   said tone signal communication section is a narrowband communication section that transmits and receives a narrowband tone signal; and
   said data signal communication section is a broadband communication section that performs modulation and transmits and receives data by means of a broadband signal.

24. The radio communication apparatus according to claim 23, further comprising a re-synchronization control section that gives notification of synchronizing with a super-frame of another group that does not share a super-frame to another radio communication apparatus belonging to the same group as itself that shares a super-frame, monitors an end tone of another group in all super-frame periods, and when having received that end tone, re-sets to a super-frame end and transmits an end tone via said narrowband communication section.

25. The radio communication apparatus according to claim 24, further comprising a beginning tone control section that transmits a narrowband signal beginning tone 1 and beginning tone 2 for collision avoidance in communication with a neighboring radio communication apparatus via said narrowband communication section, or receives said beginning tone 1 and transmits said beginning tone 2 via said narrowband communication section, or receives said beginning tone 1 and said beginning tone 2, and stops transmission of beginning tone 1 in a current super-frame.

26. The radio communication apparatus according to claim 25, further comprising:
   a probe transmitting section that gives a directive for beginning tone 1 transmission to said beginning tone control section, and upon subsequent notification of reception of beginning tone 2 from that beginning tone control section, gives a directive to said frame transmitting/receiving section for transmission of a probe request frame requesting notification of attribute and/or communication environment information to another radio communication apparatus; and
   a probe receiving section that, when having received said probe request, directs said frame transmitting/receiving section to transmit its own attribute and communication environment information.

27. A radio communication method whereby a plurality of radio communication apparatuses communicate with each other in an ad hoc network, comprising performing in a first radio communication apparatus of said plurality of radio communication apparatuses:

receiving, from a second radio communication apparatus of said plurality of communication apparatuses, an end tone for identifying an end of a current super-frame of the second radio communication apparatus;

synchronizing, at the first radio communication apparatus, an end of its own current super-frame, based on said end tone received from the second radio communication apparatus, to maintain super-frame synchronization with said second radio communication apparatus for a next super-frame;

transmitting a send/receive tone for giving notification of data transmission from said one radio communication apparatus while performing carrier sensing after an elapse of a predetermined time from an end of a super-frame; and transmitting a data signal after completion of transmission of said send/receive tone from said one radio communication apparatus.

* * * * *